(12) United States Patent
Jetzfellner

(10) Patent No.: US 12,323,532 B2
(45) Date of Patent: Jun. 3, 2025

(54) METHODS, DEVICES AND SYSTEM FOR THE SECURITY-PROTECTED PROVISION OF SETS OF DATA

(71) Applicant: Innomotics GmbH, Nuremberg (DE)

(72) Inventor: Thomas Jetzfellner, Aschheim (DE)

(73) Assignee: Innomotics GmbH, Numberg (DE)

( * ) Notice: Subject to any disclaimer, the term of this patent is extended or adjusted under 35 U.S.C. 154(b) by 853 days.

(21) Appl. No.: 17/423,221

(22) PCT Filed: Nov. 18, 2019

(86) PCT No.: PCT/EP2019/081613
§ 371 (c)(1),
(2) Date: Jul. 15, 2021

(87) PCT Pub. No.: WO2020/148001
PCT Pub. Date: Jul. 23, 2020

(65) Prior Publication Data
US 2022/0070006 A1 Mar. 3, 2022

(30) Foreign Application Priority Data
Jan. 16, 2019 (EP) ..................................... 19152115

(51) Int. Cl.
*H04L 9/32* (2006.01)
*G06F 21/62* (2013.01)
*G06F 21/64* (2013.01)
*H04L 9/00* (2022.01)

(52) U.S. Cl.
CPC ........ *H04L 9/3247* (2013.01); *G06F 21/6227* (2013.01); *G06F 21/64* (2013.01); *H04L 9/3236* (2013.01); *H04L 9/50* (2022.05)

(58) Field of Classification Search
None
See application file for complete search history.

(56) References Cited

U.S. PATENT DOCUMENTS

| 10,193,695 B1* | 1/2019 | Endress ................. G06V 20/80 |
| 2012/0254322 A1* | 10/2012 | Majeti .................. G06Q 10/107 |
| | | 709/206 |
| 2015/0172056 A1 | 6/2015 | Meunier et al. |

(Continued)

FOREIGN PATENT DOCUMENTS

| CN | 108288157 A | 7/2018 |
| CN | 108351998 A | 7/2018 |

(Continued)

OTHER PUBLICATIONS

International Search Report and Written Opinion in related PCT Patent Application No. PCT/EP2019/081613 dated Mar. 23, 2020. 23 pages.

(Continued)

*Primary Examiner* — Fatoumata Traore
(74) *Attorney, Agent, or Firm* — Schmeiser, Olsen & Watts LLP

(57) ABSTRACT

An ecosystem of devices that autonomously interact with one another by a blockchain is provided, to create a security-protected data processing of sensor data or measurement data for an object by a blockchain infrastructure. Fields of application include supply-chain scenarios or industrial control applications of blockchains.

27 Claims, 5 Drawing Sheets

(56) References Cited

U.S. PATENT DOCUMENTS

| | | | |
|---|---|---|---|
| 2015/0269570 A1 | 9/2015 | Phan et al. | |
| 2016/0300234 A1* | 10/2016 | Moss-Pultz | ............ H04L 9/3247 |
| 2018/0255131 A1 | 9/2018 | Stöcker et al. | |
| 2018/0276600 A1 | 9/2018 | Fuller et al. | |
| 2019/0220831 A1* | 7/2019 | Rangarajan | ............ H04L 9/3239 |
| 2021/0081938 A1 | 3/2021 | Falk | |

FOREIGN PATENT DOCUMENTS

| | | |
|---|---|---|
| EP | 2887333 A1 | 6/2015 |
| EP | 3340213 A1 | 6/2018 |
| EP | 3382616 A1 | 10/2018 |

OTHER PUBLICATIONS

European Search Report in related European Patent Application No. 19152115.2 dated Jul. 1, 2019. 13 pages.

Extended European Search Report in related European Patent Application No. 19152115.2 dated Jul. 19, 2019. 20 pages.

Examination Report in related European Patent Application No. 19152115.2 dated Dec. 17, 2019. 4 pages.

Examination Report in related European Patent Application No. 19152115.2 dated May 26, 2020, 8 pages.

Clarkson, William, et al., "Fingerprinting Blank Paper Using Commodity Scanners," Security and Privacy, 2009 30th IEEE Symposium on, IEEE, Piscataway, NJ, USA, pp. 301-314, XP031515112, ISBN: 978-0-7695-3633-0; pp. 302-303; Figure 2, pp. 305; 2009; 14 pages.

DeJean, Gerald et al., "RF-DNA: Radio-Frequency Certificates of Authenticity," Cryptographic Hardware and Embedded Systems—CHES 2007; [Lecture Notes in Computer Science], Springer Berlin Heidelberg, Berlin, Heidelberg, pp. 346-363, XP047030366, ISBN: 978-3-540-74734-5, Abstract, Section 1; pp. 346-351; 2007; 18 pages.

Unknown, et al., "Resource Fairness and Prioritization of Transactions in Permissioned Blockchain Systems (Industry Track)," Proceedings of the 19th International Middleware Conference Industry on, Middleware '18, pp. 46-53, XP055604353, New York, New York, USA, DOI: 10.1145/3284028.3284035; ISBN: 978-1-4503-6016-6; Figures 1, pp. 48, right column paragraph 2; pp. 48, right column paragraph 3; pp. 50, left column last paragraph—right column paragraph 1, pp. 49, left column penultimate paragraph; 2018; 8 pages.

GitHub/ "The Ethereum Book Project/Mastering Ethereum," https://github.com/ethereumbook/ethereumbook, Stand May 10, 2017; 2017; 3 pages.

Diedrich, Henning, "Ethereum: Blockchains, Digital Assets, Smart Contracts, Decentralized Autonomous Organizations," CreateSpace Independent Publishing Platform, Sep. 8, 2016 // ISBN-10: 1523930470 // ISBN-13: 978-1523930470; 3 pages.

Antonopoulos, Andreas M., "Mastering Bitcoin: Unlocking Digital Cryptocurrencies," O'Reilly Media, Dec. 2014, 282 pages.

Chen et al., "An Overview of Quality of Service Routing For Next-Generation High-Speed Networks: Problems and Solutions," IEEE Network, IEEE Service Center, New York, NY, US, vol. 12, No. 6, pp. 64-79, XP000873129, ISSN: 0890-8044, DOI: 10.1109/65.752646; pp. 64-66; 1998; 16 pages.

Needham, Roger M., et al. "Using encryption for authentication in large networks of computers," ACM: Communications of the ACM, vol. 21, No. 12, Dec. 1978; 1978; 8 pages.

Anderson, Ross "Security Engineering. A Guide to Building Dependable Distributed Systems," Wiley; Jan. 2001; 200. 600 pages.

Baird, Leemon "The Swirlds Hashgraph Consensus Algorithm: Fair, Fast, Byzantine Fault Tolerance," Swirlds Tech Report SWIRLDS-TR-2016-01; 2016; 28 pages.

Baird, Leemon "Overview of Swirlds Hashgraph," Swirlds; 2016; 4 pages.

Blockchainhub: "Blockchain Oracles", https://blockchainhub.net/blockchain-oracles/; 2018; 5 pages.

Liu Han et al:; "S-gram: Towards Semantic-Aware Security Auditing for Ethereum Smart Contracts"; ACM/IEEE International Conference on Automated Software Engineering (ASE •18); Sep. 3-7, 2018; Montpellier; France. ACM, New York; NY, USA; 6 pages; https://doi.org/10.1145/3238147. 3240728.

Fang Weidong et al:; "Cyber Security in Blockchain: Threats and Countermeasures"; Dec. 31, 2018; China Academic Journal Electronic Publishing House.

\* cited by examiner

METHODS, DEVICES AND SYSTEM FOR THE SECURITY-PROTECTED PROVISION OF SETS OF DATA

CROSS-REFERENCE TO RELATED APPLICATIONS

This application is a national stage entry of PCT Application No. PCT/EP2019/081613 having a filing date of Nov. 18, 2019, which claims priority to European Patent Application No. 19152115.2, having a filing date of Jan. 16, 2019, the entire contents of which are hereby incorporated by reference.

FIELD OF TECHNOLOGY

The following relates to methods, apparatuses and a system for security-protected provision of data records, the data records comprising for example sensor data.

BACKGROUND

Ever increasing networking of smart devices (e.g., cellular telephones, smartwatches) or manufacturing installation leads to more and more sensor data being captured by these smart devices and manufacturing installations. In particular, these data are intended to monitor manufacture or else transport of objects (e.g., workpieces, foodstuff, etc.).

SUMMARY

The technology of blockchains or "distributed ledges" is a technology currently under intense discussion and able to be realized as a distributed database system in particular. In addition to applications for decentralized payment systems (e.g., bitcoin), new potential applications are developed by the financial industry. In particular, transactions between companies can be implemented in a manipulation-protected manner without an intermediary or clearing house. This facilitates new business models without a trustworthy intermediary, reduces transaction costs, and allows new digital services to be offered flexibly without having to set up a specially set up infrastructure and trust relationships. A transaction data record (or transaction for short) protected by a blockchain comprises, e.g., program code which can also be referred to as a so-called "smart contract".

According to a first aspect, the present invention relates to a device for calculating a cryptographic checksum for a data structure, comprising:

- for example a capture module (110) for capturing individual features (M) of an object (O) by means of a capture device (A);
- for example a calculation module (120) for calculating an object-specific characteristic on the basis of the individual features;
- for example a cryptography module (130) for providing a first cryptographic key on the basis of the individual features and/or the object-specific characteristic;
- for example a protection module (130) for cryptographically protecting a data structure by means of a cryptographic checksum, wherein the protection module calculates the cryptographic checksum by means of the first cryptographic key.

Unless stated otherwise in the following description, the terms "carry out", "calculate", "computer-aided", "compute", "determine", "generate", "configure", "reconstruct" and the like relate to operations and/or processes and/or processing steps that change and/or generate data and/or convert data into other data, wherein the data may be represented or be present in particular in the form of physical variables, for example in the form of electrical pulses. The expression "computer" should in particular be interpreted as broadly as possible in order in particular to cover all electronic devices having data processing properties. Computers may thus for example be personal computers, servers, programmable logic controllers (PLC), hand-held computer systems, pocket PC devices, mobile radio devices and other communication devices that are able to process data in a computer-aided manner, processors and other electronic data processing devices.

"Computer-aided" in the context of the embodiment of the present invention may be understood to mean for example an implementation of the method in which in particular a processor performs at least one method step of the method. By way of example, "computer-aided" may also be understood to mean "computer-implemented".

A processor in the context of the embodiment of the present invention may be understood to mean for example a machine or an electronic circuit. A processor may in particular be a main processor (central processing unit, CPU), a microprocessor or a microcontroller, for example an application-specific integrated circuit or a digital signal processor, possibly in combination with a memory unit for storing program commands, etc. A processor may also for example be an IC (integrated circuit), in particular an FPGA (field-programmable gate array) or an ASIC (application-specific integrated circuit), or a DSP (digital signal processor) or a graphics processor GPU (graphics processing unit). A processor may also be understood to mean a virtualized processor, a virtual machine or a soft CPU. It may also be for example a programmable processor that is equipped with configuration steps for performing said method according to the present invention or is configured with configuration steps such that the programmable processor performs the inventive features of the method, the component, the modules, or other aspects and/or sub-aspects of the present invention.

A "memory unit" or "memory module" and the like in the context of the embodiment of the present invention may be understood to mean for example a volatile memory in the form of random access memory (RAM) or a persistent memory such as a hard disk or a data medium.

A "module" in the context of the embodiment of the present invention may be understood to mean for example a processor and/or a memory unit for storing program commands. By way of example, the processor is specifically set up to execute the program commands such that the processor performs functions for implementing or realizing the method according to the present invention or a step of the method according to the present invention. By way of example, a module can also be a node of the distributed database system which for example realizes the specific functions/features of a corresponding module. The respective modules can for example also be embodied as separate or independent modules. For this purpose, the corresponding modules can include further elements, for example. These elements are, for example, one or more interfaces (e.g., database interfaces, communication interfaces—e.g., network interface, WLAN interface) and/or an evaluating unit (e.g., a processor) and/or a memory unit. By way of example, data can be exchanged (e.g., received, transmitted, sent or provided) by means of the interfaces. By means of the evaluating unit, data can be compared, verified, processed, assigned or calculated, for example in a computer-aided and/or automated manner. By means of the memory unit, data can, for example, be stored, retrieved or provided, for example in a computer-aided and/or automated manner.

"Comprise", "have" and the like, in particular with reference to data and/or information, in the context of the embodiment of the present invention may be understood to mean for example (computer-aided) storage of a corresponding item of information or of a corresponding item of data in a data structure/data record (which is in turn stored for example in a memory unit).

"Assign", in particular with reference to data and/or information, in the context of the embodiment of the present invention may be understood to mean for example computer-aided assignment of data and/or information. To this end, a first date is for example assigned a second date by means of a memory address or a unique identifier (UID) by virtue of for example the first date being stored together with the memory address or the unique identifier of the second date in a data record.

"Provide", in particular with reference to data and/or information, in the context of the embodiment of the present invention may be understood to mean for example a computer-aided provision. By way of example, provision is implemented by means of an interface (e.g., a database interface, a network interface, an interface to a memory unit). Within the scope of the provision for example, corresponding data and/or information can be transmitted and/or sent and/or retrieved and/or received via this interface.

In the context of the embodiment of the present invention, "provide" can also be understood to mean loading or storing, for example in relation to a transaction with appropriate data. This can be implemented on or by a memory module, for example. By way of example, "provide" may also be understood to mean transfer (or send or transmit) corresponding data from one node to another node of the blockchain or of the distributed database system (or its infrastructure).

A "checksum", for example a data block checksum, a data checksum, a node checksum, a transaction checksum, a concatenation checksum or the like, in the context of the embodiment of the present invention can be understood to be for example a cryptographic checksum or cryptographic hash or hash value, which is formed or calculated in particular using a cryptographic hash function about a data record and/or data and/or one or more of the transactions and/or a portion of a data block (e.g., the block header of a block of a blockchain or data block header of a data block of the distributed database system or only some of the transactions of a data block). A checksum can be in particular a checksum(s) or hash value(s) of a hash tree (e.g., Merkle tree, Patricia tree). Furthermore, this can in particular also be understood as a digital signature or a cryptographic message authentication code. The checksums can be used to implement cryptographic protection/manipulation protection for the transactions and the data (records) stored therein, for example at different levels of the database system. By way of example, if a high level of security is required, the checksums are generated and verified at the transaction level. If a less high level of security is required, the checksums are generated and verified for example at the block level (e.g., over the entire data block or only over part of the data block and/or some of the transactions).

A "data block checksum" in the context of the embodiment of the present invention can be understood to mean a checksum which is calculated over some or all of the transactions of a data block, for example. A node can then for example check/determine the integrity/authenticity of the corresponding part of a data block by means of the data block checksum. In addition or as an alternative thereto, the data block checksum may in particular also have been formed over transactions of a preceding data block/predecessor data block of the data block. The data block checksum can in particular also be implemented using a hash tree, for example a Merkle tree [1] or a Patricia tree, the data block checksum in particular being the root checksum of the Merkle tree or a Patricia tree or a binary hash tree. In particular, transactions are secured by means of further checksums from the Merkle tree or Patricia tree (e.g., using the transaction checksums), the further checksums in particular being leaves in the Merkle tree or Patricia tree. The data block checksum can thus secure the transactions, for example, by forming the root checksum from the further checksums. The data block checksum can be calculated in particular for transactions of a specific data block of the data blocks. In particular, such a data block checksum can be included in a subsequent data block of the specific data block in order to concatenate this subsequent data block, for example with its preceding data blocks, and in particular to make the integrity of the distributed database system checkable. In this way, the data block checksum can, for example, take over the function of the concatenation checksum or be included in the concatenation checksum. The header of a data block (e.g., of a new data block or of the data block for which the data block checksum was formed) can comprise the data block checksum, for example.

A "transaction checksum" in the context of the embodiment of the present invention can be understood to mean a checksum which in particular is calculated over a transaction of a data block. Additionally, a calculation of the data block checksum for corresponding data block for example can be accelerated since already calculated transaction checksums can immediately be used as leaves, e.g., of a Merkle tree, to this end.

A "concatenation checksum" in the context of the embodiment of the present invention can be understood to mean a checksum which in particular a respective data block of the distributed database system specifies or references the preceding data block of the distributed database system (often referred to as "previous block hash" in the specialist literature) [1]. To this end, a corresponding concatenation checksum is formed in particular for the corresponding preceding data block. By way of example, a transaction checksum or the data block checksum of a data block (i.e., an existing data block of the distributed database system) can be used as concatenation checksum in order to concatenate a new data block with an (existing) data block of the distributed database system. However, it is also possible, for example, for a checksum to be formed over a header of the preceding data block or over the entire preceding data block and be used as concatenation checksum. By way of example, this can also be calculated for a plurality or all of the preceding data blocks. By way of example, forming of the concatenation checksum is also realizable by way of the header of a data block and the data blocked checksum. However, a respective data block of the distributed database system comprises a concatenation checksum in each case, the latter having been calculated for, or relating to, a preceding data block, in particular even more the directly preceding data block, of the respective data block. By way of example, it is also possible for a corresponding concatenation checksum to be formed over only part of the corresponding data block (e.g., preceding data block). By way of example, this allows realization of a data block which comprises an integrity-protected part and an unprotected part. By way of example, this could be used to realize a data block whose integrity-protected part cannot be changed and whose unprotected part can still be changed later. In this context, integrity-protected should be understood to mean that, in particular, a change in integrity-protected data is able to be determined using a checksum.

The data that are stored in a transaction of a data block for example can in particular be provided in different ways. Instead of the data, e.g., user data such as measurement data or data/ownership of assets, a transaction of a data block can only comprise the checksum for this data, for example. The corresponding checksum can be implemented in different ways. This can be, e.g., a corresponding data block checksum of a data block (with the corresponding data) of another database or of the distributed database system, a transaction checksum of a data block with the corresponding data (of the distributed database system or of a another database) or a data checksum that was formed over the data.

Additionally, the corresponding transaction can comprise a reference or specification to a storage location (e.g., an address of a file server and specification is to where the corresponding data can be found on the file server; or an address of another distributed database that comprises the data). The corresponding data could then also be provided in a further transaction of a further data block of the distributed database system for example (e.g., if the corresponding data and the associated checksums are comprised in different data blocks). However, it is also conceivable, for example, for this data to be provided via another communication channel (e.g., via another database and/or a cryptographically secured communication channel).

By way of example, an additional data record (e.g., a reference or an a specification to a storage location) can also be stored in the corresponding transactions in addition to the checksum, said additional data record in particular specifying a storage location from where the data can be retrieved. This is particularly advantageous to the end of keeping the data size of the blockchain or the distributed database system as small as possible.

"Security-protected" or "cryptographically protected" in the context of the embodiment of the present invention can be understood to mean for example protection that is implemented by a cryptographic method in particular. By way of example, this can be realized by using the distributed database system to provide or transfer or send corresponding data/transactions. This is achieved by a combination of the different (cryptographic) checksums, by virtue of these interacting synergistically in particular in order to improve the security or the cryptographic security for the data of the transactions for example. In other words, "security-protected" in the context of the present invention can also be understood to mean "cryptographically protected" and/or "tamper-proof", wherein "tamper-proof" can also be referred to as "integrity-protected".

"Concatenating the data blocks of a distributed database system" in the context of the embodiment of the present invention can be understood to mean that, for example, each data block contains information (e.g., concatenation checksum) that refers to or references another data block or a plurality of other data blocks of the distributed database system [1] [4] [5].

"Insertion into the distributed database system" and the like in the context of the embodiment of the present invention can be understood to mean that, for example, a transaction or the transactions or a data block with its transactions is transmitted to one or more nodes of a distributed database system in particular. By way of example, if these transactions are successfully validated (e.g., by the node(s)), these transactions are concatenated in particular as a new data block with at least one existing data block of the distributed database system [1] [4] [5]. For this purpose, the corresponding transactions are stored in a new data block, for example. In particular, this validation and/or concatenation can be carried out by a trustworthy node (e.g., a mining node, a blockchain oracle or a blockchain platform). In particular, a blockchain platform can be understood to mean a blockchain as a service, as proposed by Microsoft or IBM in particular. In particular, a trustworthy node and/or a node can in each case store a node checksum (e.g., a digital signature) in a data block (e.g., in the data block they have validated and generated, which is then concatenated), in particular to enable the creator of the data block to be identified and/or to enable the node to be identified. This node checksum specifies which node has concatenated the corresponding data block with at least one other data block of the distributed database system, for example.

"Transaction" or "transactions" in the context of the embodiment of the present invention can be understood to mean, for example, a smart contract [4] [5], a data structure or a transaction data record, which in particular comprises one of the transactions or a plurality of transactions in each case. "Transaction" or "transactions" in the context of the present invention can also be understood to mean, for example, the data of a transaction of a data block of a blockchain. A transaction can in particular comprise a program code which implements a smart contract, for example. By way of example, a transaction in the context of the present invention can also be understood as a control transaction and/or confirmation transaction. Alternatively, a transaction can be for example a data structure that stores data (e.g., the control commands and/or contract data and/or other data such as video data, user data, measurement data, etc.). A "transaction" in the context of the present invention can also be, or be referred to as, a message or a communication message, for example. By way of example, a message is correspondingly a transaction, the message for example comprising control commands for controlling the devices and/or also comprising prerequisites (e.g., predetermined requirements) for executing the control commands.

In particular, "storing transactions in data blocks", "storing transactions" and the like are to be understood as meaning direct storage or indirect storage. Direct storage can be understood to mean, for example, that the corresponding data block (of the distributed database system) or the corresponding transaction (of the distributed database system) comprises the respective data. Indirect storage can be understood to mean, for example, that the corresponding data block or the corresponding transaction comprises a checksum and optionally an additional data record (e.g., a reference or a specification to a storage location) for corresponding data and the corresponding data are therefore not stored directly in the data block (or the transaction) (i.e., instead only a checksum for this data). In particular, when storing transactions in data blocks, these checksums can be validated, for example, as is explained under "insertion into the distributed database system", for example.

A "program code" (e.g., a smart contract or else referred to as chain code) in the context of the embodiment of the present invention can be understood to mean, for example, a program command or a plurality of program commands that are stored in one or more transactions in particular. In particular, the program is able to be executed and is executed by the distributed database system, for example. This can be implemented, for example, by means of an execution environment (e.g., a virtual machine), wherein the execution environment or the program code are Turing-complete. The program code is executed by the infrastructure of the distributed database system [4] [5]. By way of example, a virtual machine is implemented by the infrastructure of the distributed database system in the process.

A "smart contract" (or is referred to as chain code) in the context of the embodiment of the present invention can be understood to mean, for example, an executable program code [4] [5] (see in particular the definition of "program code"). The smart contract is stored in a transaction of a distributed database system (e.g., a blockchain), for example in a data block of the distributed database system. By way of example, the smart contract can be executed in the same way as is explained in the definition of "program code", in particular in the context of the present invention.

A "smart contract process" or a "smart contract" in the context of the embodiment of the present invention can in particular also be understood to mean executing a program code or a smart contract in a process by the distributed database system or its infrastructure.

"Proof-of-work record" in the context of the embodiment of the present invention can be understood to mean, for example, solving a computationally intensive task that is to be solved in particular depending on the data block content/ content of a specific transaction [1] [4] [5]. Such a computationally intensive task is also referred to as a cryptographic puzzle, for example.

A "distributed database system", which can also be referred to as a distributed database for example, in the context of the embodiment of the present invention can be understood to mean for example a decentrally distributed database, a blockchain, a distributed ledger, a distributed storage system, distributed ledger technology (DLT) based system (DLTS), an revision-proof database system, a cloud, a cloud service, a blockchain in a cloud, a distributed storage system or a peer-to-peer database. By way of example, different implementations of a blockchain or a DLTS can also be used, such as, e.g., a blockchain or a DLTS, which by means of a directed acyclic graph (DAG), a cryptographic puzzle, a hash graph or a combination of the implementation variants mentioned [6] [7]. By way of example, different consensus algorithms can also be implemented. This can be, for example, a consensus algorithm using a cryptographic puzzle, gossip about gossip, virtual voting or a combination of the aforementioned methods (e.g., gossip about gossip combined with virtual voting) [6] [7]. By way of example, if a blockchain is used, this can be implemented in particular by means of a Bitcoin-based implementation or an Ethereum-based implementation [1] [4] [5]. By way of example, a "distributed database system" can also be understood as a distributed database system, of which at least some of its nodes and/or devices and/or infrastructure are implemented by a cloud. By way of example, the corresponding components are implemented as nodes/devices in the cloud (e.g., as a virtual node in a virtual machine). This can be done using VM-Ware, Amazon Web Services or Microsoft Azure, for example. Due to the high flexibility of the implementation variants explained, partial aspects of the implementation variants mentioned in particular can be combined with one another, for example by virtue of a hash graph being used as a blockchain, wherein the blockchain itself can also be blockless, for example.

If, for example, a directed acyclic graph (DAG) is used (e.g., IOTA or Tangle), transactions or blocks or nodes of the graph, in particular, are connected to one another via directed edges. This means in particular that edges (all edges) have the same direction (always have the same direction), similar to time, for example. In other words, it is in particular not possible to approach or jump to the transactions or the blocks or the nodes of the graph backward (i.e., against the same common direction). Acyclic means in particular that there are no loops when running through the graph.

The distributed database system can be, for example, a public distributed database system (e.g., a public blockchain) or a closed (or private) distributed database system (e.g., a private blockchain).

By way of example, if it is a public distributed database system, this means that new nodes and/or devices can join, or be accepted by, the distributed database system without credentials or without authentication or without login information or credentials. In particular, the operators of the nodes and/or devices can remain anonymous in such a case.

If the distributed database system is, for example, a closed distributed database system, new nodes and/or devices require, for example, valid proof of authorization and/or valid authentication information and/or valid credentials and/or valid login information in order to be able to join, or be accepted by, the distributed database system.

A distributed database system can, for example, also be a distributed communication system for exchanging data. This can be a network or a peer-2-peer network, for example. As an alternative or in addition thereto, the embodiment of the present invention can also be implemented for example by means of a peer-2-peer application instead of the distributed database system.

Accordingly, a peer-2-peer communication protocol, for example, can be used instead of the distributed database system. In this case, the aforementioned messages/transactions of the distributed database system, for example, are corresponding messages of the peer-2-peer communication protocol or the respective data are stored in corresponding messages. In this case, for example, storing the transactions in the distributed database system should be understood as transferring a corresponding message to the peer-2-peer communication infrastructure which implements the peer-2-peer communication protocol. By way of example, a peer-2-peer interface or a peer-2-peer application can also be used to this end or instead of the distributed database system in order to store and/or transmit the corresponding transactions or messages.

A "data block", which can also be referred to as a "member" or "block" depending on the context and implementation, in the context of the present embodiment of the present invention can be understood to mean, for example, a data block of a distributed database system (e.g., a blockchain or a peer-to-peer database), which is implemented as a data structure in particular and comprises one of the transactions or a plurality of the transactions in each case. In one implementation, the database (or the database system), for example, can be a DLT-based system (DLTS) or a blockchain and a data block can be a block of the blockchain or the DLTS. A data block can for example comprise specifications relating to the size (data size in bytes) of the data block, a data block header, a transaction counter and one or more transactions [1]. The data block header can for example comprise a version, a concatenation checksum, a data block checksum, a time stamp, a proof-of-work record and a nonce (one-time value, random value or counter used for the proof-of-work record) [1] [4] [5]. By way of example, a data block can also be only a specific memory area or address range of the overall data stored in the distributed database system. This allows implementation of, for example, blockless distributed database systems, such as, e.g., the IoT Chain (ITC), IOTA, and Byteball. In particular, the functionalities of the blocks of a blockchain and of the transactions are combined with one another in such a way that the transactions themselves, for example, secure the sequence or chain of transactions (of the distributed database system) (i.e., in particular, are stored in a secure manner). To this end the transactions themselves can be concatenated to one another using a concatenation checksum for example, by using a separate checksum or the transaction checksum of one or more transactions as the concatenation checksum, which is also stored in the corresponding new transaction when a new transaction is stored in the distributed database system. In such an embodiment, a data block can for example also comprise one or more transactions, wherein in the simplest case one data block corresponds to one transaction, for example.

"Nonce" in the context of the embodiment of the present invention can be understood to mean, for example, a cryptographic nonce (abbreviation for: "used only once" [2] or "number used once"[3]). In particular, a nonce denotes a single combination of numbers or letters that is used only once in the respective context (e.g., transaction, data transfer).

"Preceding data blocks of a (specific) data block of the distributed database system" in the context of the embodiment of the present invention can be understood to mean, for example, the data block of the distributed database system which, in particular, directly precedes a (specific) data block. Alternatively, "preceding data blocks of a (specific) data block of the distributed database system" can also be understood to mean, in particular, all data blocks of the distributed database system which precede the specific data block. In this way, the concatenation checksum or the transaction checksum, for example, can in particular only be formed over the data block (or its transactions) directly preceding the particular data block or over all data blocks (or their transactions) preceding the first data block.

A "blockchain node", "node", "node of a distributed database system" and the like in the context of the embodiment of the present invention can be understood to mean, for example, devices (e.g., field devices, cellular telephones), computers, smartphones, clients or participants that perform operations (with) the distributed database system (e.g., a blockchain) [1] [4] [5]. By way of example, such nodes can execute transactions of a distributed database system or their data blocks or insert or concatenate new data blocks with new transactions in the distributed database system by means of new data blocks. In particular, this validation and/or concatenation can be carried out or only carried out by a trustworthy node (e.g., a mining node). A trustworthy node is, for example, a node that has additional security measures (e.g., firewalls, access restrictions to the node or similar) to prevent tampering with the node. As an alternative or in addition thereto, a trustworthy node, for example can store a node checksum (e.g., a digital signature or a certificate) in the new data block when concatenating a new data block with the distributed database system. In this way, it is possible to provide evidence, in particular, which specifies that the corresponding data block was inserted by a specific node or specifies its origin. The devices (e.g., the corresponding device) are for example devices of a technical system and/or industrial installation and/or an automation network and/or a manufacturing installation, which in particular are also a node of the distributed database system. The devices can be field devices, for example, or devices in the Internet of Things, which in particular are also a node of the distributed database system. By way of example, notes can also comprise at least one processor in order to, e.g., carry out their computer-implemented functionality.

A "blockchain oracle" and the like in the context of the embodiment of the present invention can be understood to mean, for example, nodes, devices or computers which, e.g., have a security module which, for example, by means of software protection mechanisms (e.g., cryptographic methods), mechanical protection devices (e.g., a lockable housing), electrical protection devices (e.g., tamper protection or a protection system that comprises deletes the data of the security module in the event of unauthorized use/treatment of the blockchain oracle) or a combination of the options mentioned. In this case, the security module can comprise for example cryptographic keys or a secret (e.g., a character string) which are necessary for calculating the checksums (e.g., transaction checksums or node checksums).

A "computer" or a "device" in the context of the embodiment of the present invention can be understood to mean, for example, a computer (system), a client, a smartphone, a device or a server, each of which is arranged outside the blockchain and is not part of the infrastructure of the distributed database system or forms separate, detached infrastructure. A device is for example a manufacturing device and/or an electromechanical device and/or an electronic device and/or a device of an automation network (e.g., for industrial technical installations, manufacturing installations, energy or resource distribution systems); in particular, these devices are not able to communicate (directly) with the distributed database system. Correspondingly, a node can be a device, a computer, a virtual device or a virtualized computer, for example.

A "separate and/or direct communication channel" in the context of the embodiment of the present invention can be understood to mean for example a data transfer (e.g., sending, receiving, transferring, providing or transmitting) by means of a communication channel. By way of example, transactions/messages can be sent more quickly via this channel and a confirmation of this data exchange can be stored in the distributed database system. In this way, it is possible to transfer for example important and/or time-critical transactions or messages (e.g., control commands or control transactions) to a corresponding target (e.g., a device) at a higher speed and, in doing so, avoid, e.g., the slower data transfer of the distributed database system (e.g., when replicating the data blocks/transactions). By way of example, a separate and/or direct communication channel can be set up for the present invention and the cited aspects, exemplary embodiments, embodiments of the present invention and their variants for data transmission between a device (and/or node). By way of example, the transactions/messages are exchanged directly between a sender (e.g., the (first) and a receiver/target (e.g., the device that should carry out, process or evaluate the control commands) in a direct communication channel, without further nodes and/or devices of the distributed database system being involved in this data exchange. In contrast, nodes and/or devices of the distributed database system can be involved in the data exchange, for example, in the case of a separate communication channel. If the separate and/or direct communication channel was successfully set up between the sender and the receiver (thus, a communication connection was established in particular as a result), then data can be exchanged between the sender and the receiver, for example in the form of transactions or messages. By way of example, if the communication channel is closed/terminated (thus, a communication connection is terminated in particular), a result of the data transmission, e.g., in the form of transactions (e.g., as a transfer confirmation transaction or confirmation transaction), is stored in the distributed database system (e.g., in data blocks of the distributed database system), for example. The result of the data transfer can be, for example, a confirmation of the transmission or reception of the corresponding transactions/messages and/or an analysis result and/or the last transferred transaction/message transferred via the separate and/or direct communication channel before the communication channel was terminated. The transaction with the result can be stored, for example, by the sender and/or receiver. The analysis result can be, for example, the confirmation of reception of the message/transaction and/or that the message/transaction and, e.g., the control commands thereof can be processed by the target/receiver (e.g., confirmation of the implementability by the target). This can for example in turn be stored in a transaction (e.g., in an implementability confirmation transaction). As an alternative or in addition thereto, the implementability confirmation transaction is stored in the distributed database system. In this case, the implementability confirmation transaction comprises, for example, a unique identifier for the device that is able to implement the control commands and/or can, for example, specify when the control commands of the message/transaction will be implemented at the latest. As an alternative or in addition thereto, the implementability confirmation transaction comprises, for example, data on the implementation, for example how well or to what degree the control commands are worked through (e.g., how quickly the control commands are worked through, when they are safely worked through, how accurately or precisely the control commands are implemented—for example when implementing production control commands, e.g., to document processing of a workpiece).

As an alternative or in addition thereto, the implementability confirmation transaction comprises, for example, device-specific data (e.g., type of device; current device status such as readiness for operation, maintenance required, error status of the corresponding device; serial number of the device; location of the device; a checksum/hash of the implemented control commands calculated with the aid of the specified embodiment of the present invention, for example; tools used; materials used or a combination of the mentioned data) of the corresponding device (e.g., the target/receiver) which are relevant for the implementation of the control commands, wherein, e.g., the device-specific data were determined by the corresponding device at the time of the confirmation of the implementability by the device. Here, e.g., the confirmation of the implementability and the ascertainment of the device-specific data occur (approximately) at the same time—for example within a time window of a few seconds or minutes. By way of example, the data of the implementability confirmation transaction may also have been exchanged between the sender and the receiver before the implementability confirmation transaction is stored in the distributed database system, for example. By way of example, the implementability confirmation transaction can also be cryptographically protected (e.g., it can be encrypted or protected by a transaction checksum). Additionally, the last message exchanged via the communication channel, for example, can be stored in the transfer confirmation transaction (e.g., if the communication channel is interrupted) and the transfer confirmation transaction can then be stored in the distributed database system, for example. This most recently exchanged message can be used, for example, to continue the data exchange or the data transfer after the communication channel has been set up again. The transfer confirmation transaction can also be cryptographically protected, for example. The transfer confirmation transaction can comprise, for example, the control commands and/or the control transaction and/or the last message exchanged between the sender and the receiver. A continuation of the data exchange or the data transfer can, for example, also be used for other data transmissions and is not restricted specifically to the data transfer or the data exchange of a single message.

The separate and/or direct communication channel is advantageous in relation to improving a transfer speed and/or transfer latency. By way of example, a hybrid method is also possible by virtue of, for example, using an appropriate communication channel for time-critical control commands (e.g., with high or critical priority). By way of example, on the basis of the implementation requirements (e.g. time-critical control commands are priority control commands for a real-time application), it is possible to determine whether these are corresponding control commands which should be transferred via a corresponding separate communication channel and/or direct communication channel. As an alternative or in addition thereto, the determination module can determine corresponding instructions for data transfer of the message, for example when determining the message control data record.

An "object" in the context of the embodiment of the present invention can mean, for example, a physical object, physical goods, a workpiece (e.g., part of the motor or an engine part or an electronic component or a printed circuit board with electronic components), an intermediate product in production, raw materials (e.g., diamonds, petroleum), food (e.g., milk or bananas) or devices (e.g. electrical devices, electromechanical devices, electronic devices or mechatronic devices).

"Individual features" (or, for example, only referred to as features) in the context of the embodiment of the present invention can be understood to mean, for example, features (e.g., in the form of data) that can be detected by a sensor from or via the object and for example can correspond to a physical quantity (e.g., wavelength of light). In this case, the individual features are, for example, object-specific features, that is to say, e.g., that these features or data correspond to a unique combination of a sequence of ones and zeros (digital fingerprint or a type of unique identifier) in the form of binary-coded data which can be permanently assigned to a corresponding object or the object, for example. By way of example, the individual features can be surface features (e.g., scratches, surface roughness) of the object. As an alternative or in addition thereto, the individual features can be, e.g., spectroscopic data about the object (e.g., measured spectra, hyperspectral images). By way of example, the object can be gemstones, crude oil or food, of which a spectrum for the object or a predetermined position (e.g., a predetermined area and/or position) of the object is captured, e.g., by means of a capture device in the form of a spectroscope. In this respect, the individual features can be, for example, spectroscopic individual features. By way of example, the individual features can also be features that for example cannot be removed from the object without damaging or changing the object in the process. Corresponding features can be referred to as intrinsic individual features of the object, for example.

The individual features can also be, for example, individual features of a noise signal, which is captured by the capture device (e.g., an oscilloscope), for example. If the object is an electronic component, for example, an object-specific noise signal or an object-specific signal (e.g., a signal generator that generates an unchangeable specific signal is able to be configured once, for example), for example, can be captured via an interface of the object. Using this noise signal, it is possible to capture and/or take account of the amplitude of the noise signal for certain resistances and/or damping levels, for example. A specified test signal, for example, can also be provided by the object and signal distortions for the individual features can optionally be taken into account in this case. As an alternative or in addition thereto, the capture device, for example, can send a test signal which, e.g., is transferred/sent by specified circuits of the object. By way of example, the object or the corresponding circuits of the object generates a response which, e.g., comprises the test signal, the response being transmitted to the capture device. By way of example, the individual influence of the circuits on the test signal is then captured as the individual features by the capture device. This individual influence can, for example, be a distortion of the test signal. Accordingly, the individual features can be individual electronic features, for example. The individual features can also be for example acoustic features of the object (e.g., engine noises, operating noises). So that, for example, the capture device can capture the individual features as easily as possible, the manner and location (e.g., can be referred to as configuration) on the object is specified, for example, by an object data record. By way of example, this object data record can be provided by a database (e.g., a distributed database system) or this object data record is able to be retrieved for the capture module or for the capture device from the object by means of a data memory attached the object. The object can also comprise the data memory, for example. In this case, the object data record can comprise, for example, information about the type of measurement (e.g., optical, spectral, acoustic, electrical, optoacoustic, multispectral optoacoustic), the type of sensor (e.g., microphone, ultrasonic sensor, infrasonic sensor, spectral measuring systems, optoacoustic measuring systems, optoacoustic measuring systems), the location, the period of time and the measuring parameters (e.g., damping; signal filters such as high pass, low pass, band pass, frequencies, wavelengths) to be implemented in order to capture the individual characteristics.

Alternatively, for, e.g., objects of the same type (e.g., workpieces of the same type), the corresponding information, which is required to capture the individual characteristics, is fixedly specified. By way of example, in the case of an object in the form of a workpiece, the underside of the object is captured or, for example, markings are attached to the object so that the object finds the corresponding positions on the object and can capture the individual features. This fixedly specified information can be stored for example for objects of the same type in a database system (e.g., the distributed database system) or can be fixedly preconfigured in corresponding devices.

An "object-specific characteristic" (or, e.g., only referred to as characteristic) in the context of the embodiment of the present invention can be understood to mean, for example, processed (e.g., by data processing) individual features which in particular are processed in such a way in the process that the individual characteristic are able to be reproducibly generated for the same individual characteristics. In particular, tolerance values can be taken into account in order, e.g., to compensate for measurement tolerances or measurement inaccuracies of the capture device. By way of example, the object-specific characteristic is a digital fingerprint for the object. The digital fingerprint is calculated, for example, by means of an algorithm for digital fingerprints (e.g., Rabin's fingerprinting algorithm). If the individual features are, e.g., a signal or a noise signal, the signal-to-noise ratio, the phase of the signal, frequencies, wavelength information, frequency amplitudes can be used. Additionally, for example, the individual features can be evaluated, e.g., in relation to wavelengths and amplitudes in spectra. In the case of hyperspectral images, for example, the intensity of the wavelength at one or more image positions or positions on the object (or in the corresponding captured images) can be evaluated for the respective wavelengths of the images.

Before the corresponding characteristic for the corresponding individual features for example are calculated, it is possible, e.g., to preprocess the individual features in order to compensate for the measurement inaccuracies. By way of example, measurement values of the individual features lie in a possible value range (e.g., 1 to 100). This value range is divided into predetermined intervals for example, e.g., 5 value intervals (1-20, 21-40, 41-60, 61-80, 81-100). The individual value intervals are then assigned interval-specific values (e.g., 1-20: A, 21-40: B, 41-60: C, 61-80: D, 81-100: E). If, for example, a measurement value of the individual features is evaluated or preprocessed, then, e.g., the value interval in which the specific measurement value is located is verified and the interval-specific value is used for the calculation of the digital fingerprint. By way of example, for the values 1 and 100, "AE" would be the result. Other methods can also be used, for example. These are, for example, mean value methods or sliding mean value methods. The corresponding possibly preprocessed individual features are then, e.g., used as an input parameter for an algorithm for calculating the digital fingerprint. As an alternative or in addition thereto, one of the aforementioned preprocessing/processing variants, for example, can be applied to the data (individual features and/or object-specific features) which are used to ascertain or provide or calculate the first cryptographic key. Alternatively, for example, the explained preprocessing/processing for the corresponding data (e.g., the individual features and/or object-specific features and/or object-specific characteristics) can be used before these are also used for other purposes. By way of example, the cryptographic checksum can be calculated using this data processed in this way, by virtue of these data being used, e.g., as a secret when calculating the cryptographic checksum (e.g., this can be used for the device or verification device).

"Messages" in the context of the embodiment of the present invention can be understood to mean, for example, messages of a communication protocol and/or transactions of a database system (e.g., a distributed database system). By way of example, a message can correspond to the data structure or a message can comprise the data structure. The corresponding message can also comprise the corresponding cryptographic checksum, for example.

A "data structure" in the context of the embodiment of the present invention can be understood to mean, for example, a message or a transaction. Alternatively, a message or a transaction for example comprises a corresponding data structure. By way of example, the data structure, the message or the transaction may optionally comprise a corresponding cryptographic checksum for the data structure.

A "cryptographic key", for example the first cryptographic key and/or the second cryptographic key and/or the third cryptographic key, in the context of the embodiment of the present invention can be understood to mean, for example, a symmetric cryptographic key or a private key of an asymmetric cryptographic key pair or a public key of an asymmetric cryptographic key pair.

"Target" in the context of the embodiment of the present invention, for example, a device or a receiver to which a message should be transferred by means of a communication protocol.

"Priority of a message" in the context of the embodiment of the present invention, for example, the manner and/or the order in which a corresponding message is processed and/or forwarded by a node/device. In this case, a high priority means, for example, that a corresponding message should be processed as quickly and/or efficiently as possible in comparison with messages with a lower priority. In other words, a message with a high priority is over a message with a lower priority.

By way of example, the data structure used by the embodiment of the present invention can also comprise additional data, such as for example control commands to, e.g., control further transport or further processing of the object if, e.g., it was determined by the present invention that the object is authentic or corresponds to the object for which, e.g., already a corresponding data structure (e.g., with a checksum) was stored in a distributed database system, for example.

With the embodiment of the present invention, it is possible, in particular, to implement decentralized (blockchain-based) infrastructure that manages real or physical goods (e.g., objects) by digital infrastructure, the processing of should goods (e.g., production, transport and confirmation of their authenticity) being controlled. Frequently, digital twins are generated for the physical objects for example, in order, e.g., to control the further processing of an object (e.g., a workpiece) and/or to document its transport and work steps. By way of example, data about the digital twin can be stored in the data structure. By way of example, if such an object is delivered, there is a need or a necessity to be able to verify whether the object is actually the object that is assigned to the digital twin. In order to solve this task, the individual features of the object are captured by the capture device, for example. The individual features can be, for example, surface structures of the object if the object is, for example, a workpiece that was manufactured by means of machining. In this case, the individual features can be captured for example at predetermined positions of the object by the capture device (e.g., a surface capture device such as a 3D surface scanner or a surface camera), with in this case, for example, the individual features being individual surface features of the object. It is also conceivable, for example, that a digital fingerprint was incorporated into the object in the form of the individual features. This fingerprint or the digital features cannot be determined, for example, with the naked eye and/or without knowledge of the type and position or can only be determined with considerable technical effort. Accordingly, the information to capture the individual features for example can be stored in a protected memory of the device so that this information cannot be accessed by unauthorized persons. The incorporated fingerprint can be, for example, surface roughness that is generated during the manufacture of the object. As an alternative or in addition thereto, the fingerprint can be made by applying colors or particles, with the colors or particles, for example, being applied in such a way that an individual spectrum is generated for the object. To this end, different colors/particles, for example, can be distributed over the surface of the object such that, for example, a geometric spectrum is generated so that, e.g., a specified spectrum can be measured at certain positions of the object. By way of example, the spectrum or the colors/particles are chosen in such a way that they do not lie in the spectrum that is visible to the human eye. By way of example, this can be a spectrum that lies beyond 800 nm (e.g., wavelengths >800 nm such as a wavelength range between 800 nm and 1000 nm).

The individual features can also be features other than surface features, for example. By way of example, the individual features can be spectroscopic data about the object. By way of example, the object can be gemstones, crude oil or food, of which a spectrum for the object or a predetermined position (e.g., a predetermined area and/or position) of the object is captured, e.g., by means of a capture device in the form of a spectroscope. In this respect, the individual features can be, for example, spectroscopic individual features. The individual features can also be, for example, individual features of a noise signal, which is captured by the capture device (e.g., an oscilloscope), for example. If the object is an electronic component, for example, an object-specific noise signal or an object-specific signal (e.g., a signal generator that generates an unchangeable specific signal is able to be configured once, for example), for example, can be captured via an interface of the object. Using this noise signal, it is possible to capture and/or take account of the amplitude of the noise signal for certain resistances and/or damping levels, for example. A specified test signal, for example, can also be provided by the object and signal distortions for the individual features can optionally be taken into account in this case. As an alternative or in addition thereto, the capture device, for example, can send a test signal which, e.g., is transferred/sent by specified circuits of the object. By way of example, the object or the corresponding circuits of the object generates a response which, e.g., comprises the test signal, the response being transmitted to the capture device. By way of example, the individual influence of the circuits on the test signal is then captured as the individual features by the capture device. This individual influence can, be a distortion of the test signal for example. Accordingly, the individual features can be individual electronic features, for example.

Depending on the object and/or a corresponding configuration/definition, the individual features can therefore be, for example, individual surface features and/or individual spectroscopic features and/or individual electronic features. The individual features might also be acoustic features, optoacoustic features or multispectral optoacoustic features, for example. The corresponding individual features can, for example, be captured reproducibly for the object.

By way of example, the individual features can also be a combination of the specified examples for individual features.

Using the individual features, the object-specific characteristic, for example, can then be calculated. Here, for example, tolerance values for the individual features can be taken into account in order, for example, to generate a reproducible, object-specific characteristic for the object. The object-specific characteristic is advantageous to the effect of, for example, compensating for measurement inaccuracies when capturing the individual features.

By way of example, the first cryptographic key can be calculated on the basis of the individual features and/or the object-specific characteristic, by virtue of the individual features and/or the object-specific characteristic being used as input parameters for deriving a cryptographic key (e.g., the first cryptographic key). As an alternative or in addition thereto, the individual features and/or the object-specific characteristic can be compared to a specified reference value and the first cryptographic key can be released by the cryptography module in the case of a sufficient correspondence with the specified reference value. In this case, the first cryptographic key is protected against access by the cryptography module (e.g., by a key memory of the cryptography module or by cryptographic encryption) until individual features and/or an object-specific characteristic observing the specified reference value have been captured by the capture device or calculated by the calculation module. The corresponding reference value is also protected against access, for example.

The data structure can then, for example, be digitally signed with the first cryptographic key or, in one implementation variant, the digital signature of a data structure can be verified using the first cryptographic key.

By way of example, an entity (e.g., a processing device/node which creates the data structure for the object and stores the latter in the distributed database system, or the operator of the processing device/node) could additionally also protect the data structure with a further cryptographic checksum, wherein the further cryptographic checksum is, for example, the transaction checksum and the cryptographic checksum is used, for example, to determine whether the object is actually the object assigned to the data structure. The further cryptographic checksum has been generated, for example, by cryptographic keys which can be assigned to the entity, for example by virtue of a public key being provided by the entity in order to be able to verify the further cryptographic checksum.

The embodiment of the present invention is advantageous to the effect of, for example, a data structure only being able to be digitally signed if the corresponding object is physically present. To prevent the first cryptographic key being extracted by unauthorized persons from, e.g., the device for digitally signing (e.g., if the object is present and digital signing is taking place), the device can for example comprise appropriate security measures. These can be, for example, a stable housing that prevents access to the components and memory of the device. As an alternative or in addition thereto, the device can be protected, for example, by means of a protective film (e.g., a protective film against drilling), which, if the device is, e.g., manipulated (e.g., if the housing is broken open/drilled open), optionally deletes sensitive data such as the first cryptographic key or reference values.

By way of example, the data structure can be a message or a message can comprise the data structure, wherein the message is intended to be stored, for example, by a distributed database system, the distributed database system being, for example, a blockchain and the data structure being a transaction of the distributed database system and the cryptographic checksum being a transaction checksum, for example. By way of example, the cryptographic checksum is appended to the data structure so that the integrity and/or origin and/or authenticity of the data structure and its association with the object can be verified.

In a first embodiment of the device, the object-specific characteristic is calculated taking into account specified tolerance values of the individual features.

The device is advantageous to the effect of, for example, compensating measurement inaccuracies when calculating the characteristic, in order to calculate the object-specific characteristic for the correct object, optionally in reproducible fashion. By way of example, the tolerance values can be chosen in such a way that, given spectroscopic individual features of an object, e.g., in the form of food, no first cryptographic key is provided (or no valid first cryptographic key can be provided) if the object or the food is no longer fresh enough. By way of example, if the objects are bananas, the tolerance value for the spectrum of the surfaces of the bananas can be chosen in such a way that when the bananas turn brown over a large area (e.g., there is a significantly reduced green and/or yellow component in the spectrum, so that, for example, a corresponding reference value is not reached), no first cryptographic key is provided is generated for these bananas (or no valid first cryptographic key can be provided). Accordingly, at a transport point or at an intermediary, the bananas or a banana delivery with these bananas can no longer be confirmed/stored as "fresh" in a supply chain by means of a message with the data structure or the data structure in the distributed database system. In the same way, other objects in the form of perishable goods, for example, can be monitored by means of messages/data structures in a distributed database system. The corresponding tolerance values are then chosen accordingly so that no first cryptographic key is provided if the perishable goods, e.g., have degenerated too much (e.g., the shelf life of food has expired or the food has spoiled). Alternatively, if the tolerance values are exceeded, for example, an alternative cryptographic key can be provided, on the basis of which it possible to trace the point in the documentation of the transport of the object at which the tolerance values were exceeded. In other words, the tolerance values, for example, allow a threshold to be defined, the overshooting of which leads to, in particular, no corresponding valid first cryptographic key being provided or no valid cryptographic checksum being created. In particular, a tolerance value, for example, can correspond to a threshold value in such a case.

In further embodiments of the device, the first cryptographic key is calculated for example on the basis of the object-specific characteristic and/or the individual features and/or a character string. Alternatively, the cryptographic checksum, for example, can be calculated instead of the first cryptographic key.

The device is advantageous to the effect of generating the first cryptographic key even more securely, for example in combination with the character string (which can also be called a string of characters). By way of example, the object-specific characteristic is used in combination with the character string in order to provide the first cryptographic key (for example in order to calculate the latter by means of a key derivation function). The character string can be secret and can only be read and/or accessed within the device and/or the cryptography module so that the character string is not available outside the device. As an alternative or in addition thereto, the character sequence can be chosen in such a way that the latter is specified by a further cryptographic key, for example, or is the further cryptographic key. In this case, for example, the further cryptographic key can be specified by an operator or a machine that processes or works on the object. By way of example, this can be a public key or else a private key, the choice of the key depending on, for example, on the relationship of trust between those involved in the processing/management of the object. The character sequence can also be chosen in function-dependent fashion in order to generate a cryptographic key in function-dependent fashion (see, for example, the following embodiment). By way of example, a cryptographic key can be generated in this way, the latter being able to be used to decrypt the first cryptographic key upon availability.

In further embodiments of the device, a second cryptographic key, which for example decrypts the first cryptographic key, is calculated for example on the basis of the characteristic and/or the individual features and/or a character string.

By way of example, this is advantageous to secure the provision of the first cryptographic key. By way of example, the first cryptographic key is initially encrypted and is only decrypted by the second cryptographic key and thus made usable in particular.

In further embodiments of the device, the characteristic and/or the individual features for example are compared to a corresponding reference value and the first cryptographic key is released by the cryptography module, for example in the case of sufficiently accurate correspondence of the reference values with the characteristic and/or the individual features.

In further embodiments of the device, the data structure comprises an object data record, wherein the object data record specifies geometric points and/or interfaces at which the capture device can capture the individual features.

The device is advantageous to the effect of, for example, defining certain selected regions of the object or else the interfaces, by means of which the individual features can be captured by the capture device. By way of example, the interfaces can be interfaces of the object if, for example, the object is an electronic component.

In further embodiments of the device, the object data record comprises for example individual features and/or the object-specific characteristic in encrypted form, wherein, the encrypted the individual features and/or the object-specific characteristic for example can be decrypted by means of the first cryptographic key or a third cryptographic key.

The device is advantageous to the effect of, for example, rendering the characteristics verifiable by a recipient (e.g., in the sense of a delivery of goods) in order to, e.g., determine how strongly the individual features and/or the object-specific characteristics have varied during the processing of the object. By way of example, this is relevant if the object was transported over a long transport route or a plurality of production steps were carried out during the production of the object. In these aforementioned cases and other cases, a data structure is created for the object and stored, for example, in a distributed database system (as already explained above, for example). By way of example, the data structure can in this case comprise additional information about the manufacturing step, manufacturing conditions (temperatures during the manufacture), tools used and materials used. In the case of a transport, the data structure can contain, for example, information about the transport conditions (temperature for cold chains, position information, etc.). This additional information can be referred to as further object-related data, for example. By way of example, in the case of a transport, the object can be a transport container which comprises appropriate sensors and/or the device. The transport container can be, for example, a transport container for milk, precious stones or other food/materials. The transport container could comprise, for example, a device according to the present invention and a corresponding capture device.

In further embodiments of the device, the object data record for example comprises further object-related data, such as, e.g., measurement values of the object, measurement values about the object, manufacturing details of the object, whereabouts of the object, wherein the further object data are captured for example by sensors of the device for the object or by sensors of the object, wherein the sensors are for example a GPS module and/or temperature sensors and/or optical sensors and/or acoustic sensors and/or optoacoustic sensors which for example detect corresponding properties of the object.

By way of example, the sensor values can be captured during manufacture or during transport of the object and, e.g., be stored in the distributed database system (e.g., by means of the data structure, in connection with the cryptographic checksum).

In further embodiments of the device, the first cryptographic key and/or the second cryptographic key and/or the third cryptographic key is additionally calculated taking into account by means of a secret character string, and/or the first cryptographic key and/or the second cryptographic key and/or the third cryptographic key is a private key of an asymmetric key pair or is a symmetric key.

In further embodiments of the device, the data structure is a transaction of a distributed database system and the cryptographic checksum is the transaction checksum, wherein the distributed database system is a blockchain for example, wherein the device is embodied for example as a node or oracle of the distributed database system, wherein the cryptographic checksum is for example a digital signature.

According to a further aspect, the embodiment of the present invention relates to a verification device for verifying a cryptographic checksum of a data structure, comprising:
- a reception module for receiving a data structure, wherein the data structure is protected by means of a cryptographic checksum;
- a capture module (110) for capturing individual features (M) of an object (O) by means of a capture device (A);
- a calculation module (120) for calculating an object-specific characteristic (I) on the basis of the individual features;
- a cryptography module (130) for providing a cryptographic key on the basis of the individual features and/or the object-specific characteristic;
- a verification module (130) for verifying the cryptographic checksum by means of the first cryptographic key, wherein control data are provided, for example on the basis of the result of the verification.

The embodiments of the device can, for example, likewise be transferred to the verification device.

By way of example, for the purposes of verifying the data structure, too, another data structure that has been protected with a cryptographic checksum can be read from a distributed database system. This other data structure was, e.g., protected with a cryptographic key that was generated on the basis of the individual features and/or the object-specific characteristics—and thus in particular generates the same cryptographic key. By way of example, if the data structure content of the data structure and of the other data structure are identical, then the respective cryptographic checksums of the data structures match. By way of example, for this verification, the corresponding data structure content of the other data structure can be read in order to provide the corresponding data structure content.

With the embodiment of the present invention, it is possible, in particular, to implement decentralized (blockchain-based) infrastructure that manages real or physical goods (e.g., objects) by digital infrastructure, the processing of should goods (e.g., production, transport and confirmation of their authenticity) being controlled. Frequently, digital twins are generated for the physical objects for example, in order, e.g., to control the further processing of an object (e.g., a workpiece) and/or to document its transport and work steps. By way of example, data about the digital twin are stored in the data structure. By way of example, if such an object is delivered, there is a need or a necessity to be able to verify whether the object is actually the object that is assigned to the digital twin. In order to solve this task, the individual features of the object are captured by the capture device, for example. By way of example, the individual features can be surface structures of the object if the object is, for example, a workpiece that was manufactured by means of machining. In this case, the individual features can be captured for example at predetermined positions of the object by the capture device (e.g., a surface capture device such as a 3D surface scanner or a surface camera), with in this case, for example, the individual features being individual surface features of the object. By way of example, it is also conceivable that a digital fingerprint was incorporated in the object in the form of the individual features. This fingerprint or the digital features cannot be determined, for example, with the naked eye and/or without knowledge of the type and position or can only be determined with considerable technical effort. Accordingly, the information to capture the individual features for example can be stored in a protected memory of the verification device so that this information cannot be accessed by unauthorized persons. The incorporated fingerprint can be, for example, surface reference that is generated during the manufacture of the object. As an alternative or in addition thereto, the fingerprint can be made by applying colors or particles, with the colors or particles, for example, being applied in such a way that an individual spectrum is generated for the object. To this end, different colors/particles, for example, can be distributed over the surface of the object such that, for example, a geometric spectrum is generated so that, e.g., a specified spectrum can be measured at certain positions of the object. By way of example, the spectrum or the colors/particles are chosen in such a way that they do not lie in the spectrum that is visible to the human eye. By way of example, this can be a spectrum that lies beyond 800 nm. It is possible, for example, for the individual features that are incorporated in the object in the form of the fingerprint to provide a public key or the data for calculating a public key. The public key is, for example, the first cryptographic key. By way of example, it is also conceivable for electronic circuits to be interconnected in such a way that a configurable fingerprint or individual features are generated for the object if, for example, the object is an electronic component or the object comprises an electronic component.

The individual features can also be features other than surface features, for example. By way of example, the individual features can be spectroscopic data about the object. By way of example, the object can be gemstones, crude oil or food, of which a spectrum for the object or a predetermined position (e.g., a predetermined area and/or position) of the object is captured, e.g., by means of a capture device in the form of a spectroscope. In this respect, the individual features can be, for example, spectroscopic individual features. The individual features can also be, for example, individual features of a noise signal, which is captured by the capture device (e.g., an oscilloscope), for example. By way of example, if the object is an electronic component, an object-specific noise signal can be captured via an interface of the object. Using this noise signal, it is possible to capture and/or take account of the amplitude of the noise signal for certain resistances and/or damping levels, for example. A specified test signal, for example, can also be provided by the object and signal distortions for the individual features can optionally be taken into account in this case. As an alternative or in addition thereto, the capture device, for example, can send a test signal which, e.g., is transferred/sent by specified circuits of the object. By way of example, the object or the corresponding circuits of the object generates a response which, e.g., comprises the test signal, the response being transmitted to the capture device. By way of example, the individual influence of the circuits on the test signal is then captured as the individual features by the capture device. This individual influence can, for example, be a distortion of the test signal. Accordingly, the individual features can be individual electronic features, for example.

Depending on the object and/or a corresponding configuration/definition, the individual features can therefore be, for example, individual surface features and/or individual spectroscopic features and/or individual electronic features. The individual features might also be acoustic features, optoacoustic features or multispectral optoacoustic features, for example. The corresponding individual features can, for example, be captured reproducibly for the object.

Using the individual features, the object-specific characteristic, for example, can then be calculated. Here, for example, tolerance values for the individual features can be taken into account, for example in order to generate a reproducible, object-specific characteristic for the object. The object-specific characteristic is advantageous to the effect of, for example, compensating for measurement inaccuracies when capturing the individual features.

By way of example, the first cryptographic key can be calculated on the basis of the individual features and/or the object-specific characteristic, by virtue of the individual features and/or the object-specific characteristic being used as input parameters for deriving a cryptographic key (e.g., the first cryptographic key). As an alternative or in addition thereto, the individual features and/or the object-specific characteristic can be compared to a specified reference value and the first cryptographic key can be released by the cryptography module in the case of a sufficient correspondence with the specified reference value. In this case, the first cryptographic key is protected against access by the cryptography module (e.g., by a key memory of the cryptography module or by cryptographic encryption) until individual features and/or an object-specific characteristic observing the specified reference value have been captured by the capture device or calculated by the calculation module. The corresponding reference value is also protected against access, for example.

With the first cryptographic key, for example, the cryptographic checksum (e.g., a digital signature) can be of a data structure and this key or the generation/provision of the key is linked to the object, this can also hence implicitly confirm that it is the object which the data structure has protected with the checksum. For this purpose, the cryptographic checksum, for example, is calculated by means of a cryptographic key (e.g., the first cryptographic key of the previously described device or verification device with the respective exemplary embodiments) for the data structure. Depending on the implementation, a public key is transmitted to the verification device, for example, and this key is then stored in the verification device in an access-protected manner. The public key is, for example, associated with a private key with which the cryptographic checksum was calculated. In such a variant, for example, the public key can be released by comparing it to the reference values, or it can be made available in object-bound fashion by applying the fingerprint to the object. By way of example, it is also conceivable that cryptographic keys which were generated by means of a symmetrical cryptographic method are used for the generation and verification of the cryptographic checksum of the data structure are.

By way of example, an entity (e.g., a processing device/node which creates the data structure for the object and stores the latter in the distributed database system, or the operator of the processing device/node) could additionally also protect the data structure with a further cryptographic checksum, wherein the further cryptographic checksum is, for example, the transaction checksum and the cryptographic checksum is used, for example, to determine whether the object is actually the object assigned to the data structure. The further cryptographic checksum has been generated, for example, by cryptographic keys which can be assigned to the entity, for example by virtue of a public key being provided by the entity in order to be able to verify the further cryptographic checksum.

The embodiment of the present invention is advantageous to the effect of, for example, a digital signature of the data structure being able to be verified if the corresponding object is physically present. In particular, this results in a stronger assignment of an object to the data structures associated with the respective object. To prevent the first cryptographic key being extracted by unauthorized persons from, e.g., the verification device for digitally signing, the verification device can for example comprise appropriate security measures. These can be, for example, a stable housing that prevents access to the components and memory of the verification device. As an alternative or in addition thereto, the verification device can be protected, for example, by means of a protective film (e.g., a protective film against drilling), which, if the verification device is, e.g., manipulated (e.g., if the housing is broken open/drilled open), optionally deletes sensitive data such as the first cryptographic key or reference values. By means of the verification result of the verification of the cryptographic checksum or the control data, it is then possible to confirm, for example, that the data structure is associated with the corresponding object or the data of the data structure relate to the object.

By way of example, the data structure can be a message or a message can comprise the data structure, wherein the message is intended to be stored, for example, by a distributed database system, the distributed database system being, for example, a blockchain and the data structure being a transaction of the distributed database system and the cryptographic checksum being a transaction checksum, for example. By way of example, the cryptographic checksum is appended to the data structure so that the integrity and/or origin and/or authenticity of the data structure and its association with the object can be verified.

In a first embodiment of the verification device, the object-specific characteristic is calculated taking into account specified tolerance values of the individual features.

The verification device is advantageous to the effect of, for example, compensating measurement inaccuracies when calculating the characteristic, in order to calculate the object-specific characteristic for the correct object, optionally in reproducible fashion. By way of example, the tolerance values can be chosen in such a way that, given spectroscopic individual features of an object, e.g., in the form of food, no first cryptographic key is provided (or no valid first cryptographic key can be provided) if the object or the food is no longer fresh enough. By way of example, if the objects are bananas, the tolerance value for the spectrum of the surfaces of the bananas can be chosen in such a way that when the bananas turn brown over a large area, no first cryptographic key is provided is generated for these bananas (or no valid first cryptographic key can be provided). Accordingly, at a transport point or at an intermediary, the bananas or a banana delivery with these bananas can no longer be confirmed as "fresh" in a supply chain by means of a message with the data structure or the data structure in the distributed database system since it is no longer possible to generate or provide a valid key for the verification of the cryptographic checksum. In the same way, other objects in the form of perishable goods, for example, can be monitored by means of messages/data structures in a distributed database system. The corresponding tolerance values are then chosen accordingly so that no first cryptographic key is provided if the perishable goods, e.g., have degenerated too much (e.g., the shelf life of food has expired or the food has spoiled). In other words, the tolerance values, for example, allow a threshold to be defined, the overshooting of which leads to, in particular, no corresponding valid first cryptographic key being provided or no valid cryptographic checksum being created. In particular, a tolerance value, for example, can correspond to a threshold value in such a case.

In further embodiments of the checking device, the first cryptographic key is calculated, for example, on the basis of the object-specific characteristics and/or the individual features and/or a character string. Alternatively, the cryptographic checksum, for example, can be calculated instead of the first cryptographic key.

The verification device is advantageous to the effect of generating the first cryptographic key even more securely, for example in combination with the character string (which can also be called a string of characters). By way of example, the object-specific characteristic is used in combination with the character string in order to provide the first cryptographic key (for example in order to calculate the latter by means of a key derivation function). The character string can be secret and can only be read and/or accessed within the verification device and/or the cryptography module so that the character string is not available outside the device. As an alternative or in addition thereto, the character sequence can be chosen in such a way that the latter is specified by a further cryptographic key, for example, or is the further cryptographic key. In this case, for example, the further cryptographic key can be specified by an operator or a machine that processes or works on the object. By way of example, this can be a public key or else a private key, the choice of the key depending on, for example, on the relationship of trust between those involved in the processing/management of the object. The character sequence can also be chosen, e.g., in function-dependent fashion in order to generate a cryptographic key in function-dependent fashion (see, for example, the following embodiment). By way of example, a cryptographic key can be generated in this way, the latter being able to be used to decrypt the first cryptographic key upon availability.

In further embodiments of the verification device, a second cryptographic key, which for example decrypts the first cryptographic key, is calculated for example on the basis of the characteristic and/or the individual features and/or a character string.

In further embodiments of the verification device, the characteristic and/or the individual features for example are compared to a corresponding reference value and the first cryptographic key is released by the cryptography module, for example in the case of sufficiently accurate correspondence of the reference values with the characteristic and/or the individual features.

In further embodiments of the verification device, the data structure comprises an object data record, wherein the object data record specifies geometric points and/or interfaces at which the capture device can capture the individual features.

The verification device is advantageous to the effect of, for example, defining certain selected regions of the object or else the interfaces, by means of which the individual features can be captured by the capture device. By way of example, the interfaces can be interfaces of the object if, for example, the object is an electronic component.

In further embodiments of the verification device, the object data record comprises for example individual features and/or the object-specific characteristic in encrypted form, wherein, the encrypted the individual features and/or the object-specific characteristic for example can be decrypted by means of the first cryptographic key or a third cryptographic key.

The verification device is advantageous to the effect of, for example, rendering the characteristics verifiable by a recipient (e.g., in the sense of a delivery of goods), for example to determine how strongly the individual features and/or the object-specific characteristics have varied during the processing of the object. By way of example, this is relevant if the object was transported over a long transport route or a plurality of production steps were carried out during the production of the object. In these aforementioned cases and other cases, a data structure is created for the object and stored, for example, in a distributed database system (as already explained above, for example). By way of example, the data structure can in this case comprise additional information about the manufacturing step, manufacturing conditions (temperatures during the manufacture), tools used and materials used. In the case of a transport, the data structure can contain, for example, information about the transport conditions (temperature for cold chains, position information, etc.). This additional information can be referred to as further object-related data, for example. By way of example, in the case of a transport, the object can be a transport container which comprises appropriate sensors and/or the verification device. The transport container can be, for example, a transport container for milk, precious stones or other food/materials. The transport container could comprise, for example, a device according to the present invention and/or a verification device according to the present invention and/or a corresponding capture device.

In further embodiments of the verification device, the object data record for example comprises further object-related data, such as, e.g., measurement values of the object, measurement values about the object, manufacturing details of the object, whereabouts of the object, wherein the further object data are captured for example by sensors of the verification device for the object or by sensors of the object, wherein the sensors are for example a GPS module and/or temperature sensors and/or optical sensors and/or acoustic sensors and/or optoacoustic sensors which for example detect corresponding properties of the object In further embodiments of the verification device, the first cryptographic key and/or the second cryptographic key and/or the third cryptographic key is additionally calculated taking into account by means of a secret character string, and/or the first cryptographic key and/or the second cryptographic key and/or the third cryptographic key is a private key of an asymmetric key pair or is a symmetric key.

In further embodiments of the verification device, the data structure is a transaction of a distributed database system and the cryptographic checksum is the transaction checksum, wherein the distributed database system is a blockchain for example, wherein the verification device is embodied for example as a node or oracle of the distributed database system, wherein the cryptographic checksum is for example a digital signature.

According to a further aspect, the embodiment of the present invention relates to a write control module comprising:
 a communication interface for transferring messages, wherein the messages are transferred to a distributed database system for example;
 a verification module, wherein
  the verification module loads a data write configuration that specifies the conditions under which the messages are written to the distributed database system,
  the verification module verifies whether the conditions for writing the messages to the distributed database system are met;
 a transfer control module, wherein
  the transfer control module controls a transfer of a message to the distributed database system by means of the communication interface on the basis of a check result of the verification module.

In particular, the embodiment of the present invention renders it possible to implement a decentralized (blockchain-based) infrastructure in which, for example, it is possible to define and control the conditions under which a message is written to the distributed database system. By way of example, this makes it possible to avoid writing to a distributed database system which is, e.g., currently in an error state or restricted operating state. To this end, the data write configuration for example is evaluated, the latter being able to specify that, for example, messages or transactions from a specified other node are also present in the distributed database system in order to keep the latter relatively up-to-date. By way of example, this can be specified by the data write configuration by means of a time window which specifies a maximum permitted age for the messages or the transactions of the other nodes. For this verification, the messages or transactions of the other nodes are provided with for example a time stamp and a checksum (e.g., a transaction checksum, more particularly in the form of a digital signature) or comprise such a checksum. By means of the checksum, a public key can optionally be used to determine whether the corresponding messages/transactions in fact originate from the corresponding specified nodes.

In further embodiments of the write control module, the data write configuration specifies that one or more specified nodes have already written messages to the distributed database system, with the conditions of the data write configuration, for example, specifying that messages from the nodes are already present in the advantageous database system.

In further embodiments of the write control module, the checksums of messages from one or more nodes are verified when verifying the conditions of the data write configuration, wherein the messages for verification, for example, are stored in the distributed database system, wherein the conditions which the messages for verification are supposed to meet, for example, are defined by the data write configuration.

In further embodiments of the write control module, the write control module selects one or more checksum-protected messages of the distributed database system, wherein for example corresponding data about the corresponding messages are stored by the sending apparatus.

The write control module is advantageous to effect of, for example determining by means of the selected messages whether the distributed database system has been manipulated or the destination address has been modified by a manipulation in a routing table. A change in a blockchain, for example by way of a fork, can also be recognized hereby. To this end, the data include, for example, the transactions with the messages, block numbers of the messages and the checksums of the block and/or the transactions with the messages, wherein, for example, a message can also be a transaction.

In further embodiments of the write control module, the write control module verifies the selected messages or some of the selected messages on the basis of the stored messages when verifying the conditions of the data write configuration.

In further embodiments of the write control module, the conditions of the data write configuration comprise one, a plurality, or a combination of the following parameters:

a time window that must be observed for messages to be verified and/or selected, the nodes are specified by the corresponding node information, the messages of the corresponding nodes must comprise a specified content, the checksums of the messages to be verified must meet specified cryptographic conditions.

According to a further aspect, the embodiment of the present invention relates to a transmission apparatus for controlling a transmission of a message, comprising:

a message data capture module, wherein
 the message data capture module reads a priority data record with a priority from a message,
 the message data capture module reads a destination of the message,
 the priority is assigned transmission parameters for the message transmission;
a determination module, wherein
 the determination module generates a message control data record for controlling the transfer of the message on the basis of the destination and the priority,
 the message control data record is assigned to the message,
a transfer module, wherein
 the transfer module transmits the message to a node of a distributed database system depending on the message control data record,
 the node is specified by the message control data record.

In particular, the embodiment of the present invention renders it possible to implement a decentralized (blockchain-based) infrastructure in which, for example, messages or transactions that have a high priority are transferred to their destination in an accelerated manner within the decentralized infrastructure. By way of example, this is necessary so that messages or transactions that are to be processed quickly by a specific or specified node (also referred to as a destination) are also to be transmitted quickly to this node in industrial applications. By way of example, if a message about the emergency shutdown of a manufacturing installation or an alarm from a sensor (e.g., a smoke detector or a heat sensor in a manufacturing machine) is transferred by means of decentralized infrastructure to a node that controls this emergency shutdown, it is necessary that a corresponding message is transferred as quickly as possible by means of the decentralized infrastructure to the node to be processed. To achieve this, messages with a high priority for example can be by the decentralized infrastructure or the distributed database system when replicating the messages or when transferring the messages. By way of example, routes for the decentralized infrastructure can be specified or separate communication channels can be set up to this end, in order, e.g., to ensure the specifications of a fast transfer to the destination. In order to achieve this, interfaces for data input for the distributed database system (e.g., blockchain oracles), for example, can be equipped with the transmission apparatus according to the present invention. Alarm sensors, for example, as mentioned above can be communicatively connected via these interfaces so that the described emergency shutdown of a system can optionally take place.

In further embodiments of the transmission apparatus, the message control data record comprises a route over a plurality of nodes of the distributed database system, wherein for example to ascertain the route, the transmission time of messages between the nodes is transferred by the nodes to the transmission apparatus and, in particular, the corresponding transmission times are taken into account when ascertaining the message control data record, wherein the route for example is determined on the basis of the result of the check (the priority).

In further embodiments of the transmission apparatus, the message control data record comprises configuration data, wherein the configuration data for example are determined on the basis of the result of the check, wherein the transfer module for example is configured in such a way that a separate and/or direct communication channel to the destination is set up to transfer the message.

The transmission device is advantageous to the effect of, for example, facilitating a fast transfer for the corresponding message to the destination without using the replication mechanism of the distributed database system and, for example, only documenting the receipt of the message by means of a confirmation transaction and/or documenting the sending of the message by means of a corresponding send transaction. This is advantageous, for example, for transferring the message to the destination as quickly as possible, but still documenting the transfer and receipt securely through the distributed database system by way of the confirmation transaction and/or the send transaction. For this purpose, the send transaction comprises, for example, send date and/or send time and/or destination (e.g., destination address), a confirmation of the establishment of a connection to the destination and/or a confirmation of the transfer to the destination, wherein the confirmation of the transfer was confirmed by for example the destination by a checksum such as a digital signature by means of a corresponding confirmation message to the transmission apparatus (this confirmation message can optionally also be stored in the send transaction). The confirmation transaction, for example, can be structured analogously. The latter comprises, for example, reception date and/or reception time and/or transmission address (e.g., the address of the transmission apparatus), a confirmation of the establishment of a connection from the transmitter and/or a confirmation of the transfer from the transmitter, wherein the confirmation of the transfer was confirmed (e.g., by the transmitter by a checksum such as a digital signature) by means of a corresponding confirmation message to the transmission apparatus (this confirmation message can optionally also be stored in the send transaction). The message itself can again be protected by means of a transaction checksum, for example. The content of the message can also be stored in the confirmation transaction, for example.

In further embodiments of the transmission apparatus, a confirmation transaction is stored in the distributed database system after the destination has received the message.

The transmission apparatus is advantageous to the effect of, for example, documenting how fast the data transfer for messages to a destination takes place. In the process, the respective transfer times between the individual nodes of the distributed database system, for example, can be documented. Using the confirmation transactions, the transmission apparatus can then calculate the appropriate route through the infrastructure of the distributed database system for the priority.

In further embodiments of the transmission apparatus, the message control data record additionally comprises a preconfigured data record which at least partially specifies the transfer path of the message to the destination.

The transmission apparatus is advantageous to the effect of, for example, at least partly specifying a route. By way of example, it is also possible here to take account of the further parameters, which should be taken into account during a transfer between the nodes or during the route. By way of example, these parameters can be used to specify that nodes in a specific/specified region (e.g., specified countries such as North Korea, Andorra, Eritrea or Iran) are not permitted for transfer and, for example, may not be used in the route. Alternatively, it may be specified that only nodes located in a certain region (e.g., EU, USA, Kazakhstan) may be used for the route. By way of example, it is also possible to define specifications to the effect of only allowing appropriate nodes for the route, which nodes have certain hardware equipment (e.g., redundant components, broadband network connection, cryptographic security mechanisms, access protection against unauthorized persons). In particular what this can achieve is that the corresponding message is not validated until the validation of the confirmation transaction, and so time-consuming solving of a proof-of-work (cryptographic puzzle), for example, is not necessary for the transfer to the destination, which is advantageous in particular for messages with high priority that are to be transferred quickly. The confirmation of the data exchange by means of the confirmation transaction and/or the send transaction is not time-critical in turn and these transactions can also be validated in regular fashion.

In further embodiments of the transmission apparatus, the transmission apparatus for example comprises a write control module, wherein the priority data record with the priority is specified by the sensor device for example and for example the message comprises a data structure (e.g., with sensor data), wherein checksums are transaction checksums for example and/or the distributed database system for example is a block chain and/or the message is a validated or unvalidated transaction of a distributed database system.

According to a further aspect, the embodiment of the present invention relates to a system comprising:
a generation module for generating messages for an object, wherein the message for example comprises a priority data record with a priority and a data structure;
a device for calculating a cryptographic checksum for the data structure, comprising:
 a capture module (110) for capturing individual features (M) of the object (O) by means of a capture device (A);
 a calculation module (120) for calculating an object-specific characteristic (I) on the basis of the individual features;
 a cryptography module (130) for providing a cryptographic key on the basis of the individual features and/or the object-specific characteristic;
 a protection module (130) for cryptographically protecting the data structure by means of a cryptographic checksum, wherein the protection module calculates the cryptographic checksum by means of the cryptographic key;
a write control module, comprising:
 a communication interface for transferring messages, wherein the messages are transferred to a distributed database system for example;
 a verification module, wherein
  the verification module loads a data write configuration that specifies the conditions under which the messages are written to the distributed database system,
  the verification module verifies whether the conditions for writing the messages to the distributed database system are met;
 a transfer control module, wherein
  the transfer control module controls a transfer of a message to the distributed database system by means of the communication interface on the basis of a check result of the verification module,
a transmission apparatus for controlling a transmission of the message via a plurality of nodes, comprising:
 a message data capture module, wherein
  the message data capture module reads a priority data record with a priority from a message,
  the message data capture module reads a destination of the message,
  the priority is assigned transmission parameters for the message transmission;
 a determination module, wherein
  the determination module generates a message control data record for controlling the transfer of the message on the basis of the destination and the priority,
  the message control data record is assigned to the message,
 a transfer module, wherein
  the transfer module transmits the message to a node of a distributed database system depending on the message control data record,
 the node is specified by the message control data record,
 for example the communication interface transmits a message by means of a transmission apparatus.

According to a further aspect, the embodiment of the present invention relates to a method for computer-aided calculation of a cryptographic checksum, including the following method steps:
capturing individual features (M) of an object (O) by means of a capture device (A);
calculating an object-specific characteristic on the basis of the individual features;
providing a first cryptographic key on the basis of the individual features and/or the object-specific characteristic;
cryptographically protecting a data structure by means of a cryptographic checksum, wherein the cryptographic checksum is calculated by means of the first cryptographic key.

In further embodiments of the method, the method comprises further method steps for implementing the functional features or for implementing further features of the device or its embodiments.

According to a further aspect, the embodiment of the present invention relates to a method for computer-aided verification of a cryptographic checksum, including the following method steps:
receiving a data structure, wherein the data structure is protected by means of a cryptographic checksum;

capturing individual features (M) of an object (O) by means of a capture device (A);

calculating an object-specific characteristic on the basis of the individual features;

providing a first cryptographic key on the basis of the individual features and/or the object-specific characteristic;

verifying the cryptographic checksum by means of the first cryptographic key.

In further embodiments of the method, the method comprises further method steps for implementing the functional features or for implementing further features of the verification device or its embodiments.

According to a further aspect, the embodiment of the present invention relates to a method for computer-aided control of a data transfer, including the following method steps:

transferring messages, wherein the messages are transferred to a distributed database system for example;

verifying a data write configuration, wherein
the data write configuration specifies the conditions under which the messages are written to the distributed database system,
verifying whether the conditions for writing the messages to the distributed database system are met;

transferring the messages to a distributed database system by means of a communication interface, wherein
the transfer is controlled on the basis of a check result of verifying the data write configuration.

In further embodiments of the method, the method comprises further method steps for implementing the functional features or for implementing further features of the write control module or its embodiments.

According to a further aspect, the embodiment of the present invention relates to a method for computer-aided control of a transmission of messages over a plurality of nodes, including the following method steps:

reading a message of a priority data record with a priority of a message, wherein
a destination of the message is read,
the priority is assigned transmission parameters for the message transmission;

determining a message control data record for controlling the transfer of the message on the basis of the priority and the destination, wherein
the message control data record is assigned to the message, transmitting the message to a node of a distributed database system depending on the message control data record, wherein
the node is specified by the message control data record for example.

In further embodiments of the method, the method comprises further method steps for implementing the functional features or for implementing further features of the transmission apparatus or its embodiments.

Furthermore, a computer program product (non-transitory computer readable storage medium having instructions, which when executed by a processor, perform actions) containing program commands for carrying out the aforementioned methods according to the embodiment of the present invention is claimed, wherein one of the methods according to the present invention, all methods according to the present invention or a combination of the methods according to the present invention can be carried out in each case by means of the computer program product.

Additionally claimed is a variant of the computer program product containing program commands for configuring a creation device, for example a 3D printer, a computer system or a production machine suitable for creating processors and/or devices, wherein the creation device is configured, by way of the program commands, such that said device according to the embodiment of the present invention and/or the write control module and/or the verification device and/or the transmission apparatus is created.

Also claimed is a provision device for storing and/or providing the computer program product. The provision device is for example a data carrier that stores and/or provides the computer program product. As an alternative and/or in addition, the provision device is for example a network service, a computer system, a server system, in particular a distributed computer system, a cloud-based computer system and/or virtual computer system that stores and/or provides the computer program product in the form of a data stream.

This provision takes place for example as a download in the form of a program data block and/or command data block, as a file, in particular as a download file or as a data stream, in particular as a download data stream, of the complete computer program product. This provision may however also take place for example as a partial download that consists of multiple parts and is downloaded in particular via a peer-to-peer network or provided as a data stream. Such a computer program product is installed in a system for example using the provision device in the form of the data carrier and executes the program commands such that the method according to the embodiment of the present invention is executed on a computer or configures the creation device such that it creates the device according to the present invention and/or the write control module and/or the verification device and/or the transmission apparatus.

BRIEF DESCRIPTION

Some of the embodiments will be described in detail, with reference to the following figures, wherein like designations denote like members, wherein.

In the figures, elements with the same function are provided with the same reference signs, unless stated otherwise.

DETAILED DESCRIPTION

The following exemplary embodiments, unless stated otherwise or already stated, have at least one processor and/or one storage unit for implementing or executing the method.

A (relevant) person skilled in the art having knowledge of the one or more method claims is also in particular aware of all options for producing products or implementation options that are routine in the prior art, and so there is in particular no need for any independent disclosure in the description. These customary implementation variants known to a person skilled in the art may in particular be implemented solely through hardware (components) or solely through software (components). As an alternative and/or in addition, a person skilled in the art may, within the scope of his expert knowledge, select as far as possible any inventive combinations of hardware (components) and software (components) to implement implementation variants according to the present invention.

An inventive combination of hardware (components) and software (components) may be involved in particular when some of the inventive effects are brought about exclusively by special hardware (for example a processor in the form of an ASIC or FPGA) and/or others are brought about by the (processor-aided and/or memory-aided) software.

In view of the high number of different implementation options, it is in particular impossible and also not beneficial or necessary for the understanding of the embodiment of the present invention to cite all of these implementation options. In this respect, all of the following exemplary embodiments are intended in particular to show only a few ways, by way of example, as to how in particular such implementations of the inventive teaching could look.

The features of the individual exemplary embodiments are therefore in particular not restricted to the respective exemplary embodiment, but rather refer in particular to the embodiment of the present invention in general. Features of one exemplary embodiment may accordingly also serve as features for another exemplary embodiment, in particular without this having to be mentioned explicitly in the respective exemplary embodiment.

FIG. 1 to FIG. 7 each show exemplary embodiments of the different aspects of the embodiment of the present invention.

Figure 1:
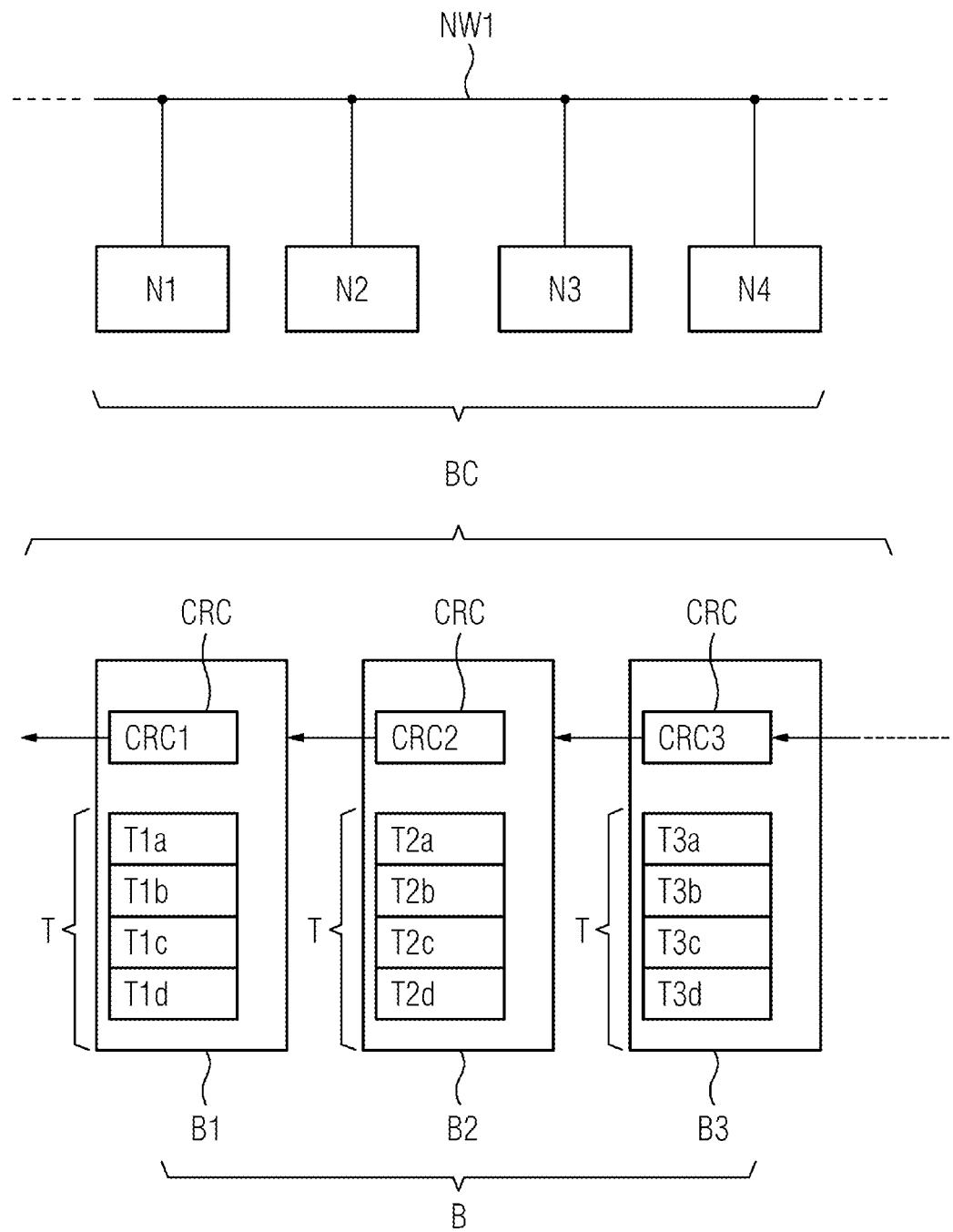
FIG. 1 depicts a first exemplary embodiment of the present invention.

In this case, FIG. 1 shows a system which is used to store sensor data, for example, in a distributed database system.

By way of example, the system can comprise the following features:
- a generation module for generating messages for an object, wherein the message for example comprises a priority data record with a priority and a data structure;
- a device for calculating a cryptographic checksum for the data structure, comprising:
  - a capture module for capturing individual features of the object by means of a capture device;
  - a calculation module for calculating an object-specific characteristic on the basis of the individual features;
  - a cryptography module for providing a cryptographic key on the basis of the individual features and/or the object-specific characteristic;
  - a protection module for cryptographically protecting the data structure by means of a cryptographic checksum, wherein the protection module calculates the cryptographic checksum by means of the cryptographic key;
- a write control module, comprising:
  - a communication interface for transferring messages, wherein the messages are transferred to a distributed database system for example;
  - an inspection module, wherein
    - the verification module loads a data write configuration that specifies the conditions under which the messages are written to the distributed database system,
    - the verification module verifies whether the conditions for writing the messages to the distributed database system are met;
  - a transfer control module, wherein
    - the transfer control module controls a transfer of a message to the distributed database system by means of the communication interface on the basis of a check result of the verification module,
- a transmission apparatus for controlling a transmission of the message via a plurality of nodes, comprising:
  - a message data capture module, wherein
    - the message data capture module reads a priority data record with a priority from a message,
    - the message data capture module reads a destination of the message,
    - the priority is assigned transmission parameters for the message transmission;
  - a determination module, wherein
    - the determination module generates a message control data record for controlling the transfer of the message on the basis of the destination and the priority,
    - the message control data record is assigned to the message,
  - a transfer module, wherein
    - the transfer module transmits the message to a node of a distributed database system depending on the message control data record,
    - the node is specified by the message control data record, for example the communication interface transmits a message by means of a transmission apparatus.

FIG. 1 shows a first node N1, a second node N2, a third node N3 and a fourth node N4, which form the nodes of the blockchain BC of the distributed database system, wherein one of the nodes, e.g., the first node N1, comprises the device and/or the write control module and/or the communication apparatus. Alternatively, different nodes N1-N4 can each comprise the individual components, i.e., the device and/or the write control module and/or the transmission apparatus. The nodes are connected to one another, e.g., via a first communication network NW1.

Furthermore, FIG. 1 shows blocks B, for example a first block B1, a second block B2 and a third block B3, of a blockchain BC, a section of the blockchain BC, in particular, being shown here in exemplary fashion.

The blocks B each comprise a plurality of transactions T. The transactions T can comprise control transactions and/or confirmation transactions.

The first block B1 comprises, for example, a first transaction T1a, a second transaction T1b, a third transaction T1c and a fourth transaction T1d.

The second block B2 comprises, for example, a fifth transaction T2a, a sixth transaction T2b, a seventh transaction T2c and an eighth transaction T2d.

The third block B3 comprises, for example, a ninth transaction T3a, a tenth transaction T3b, an eleventh transaction T3c and a twelfth transaction T3d.

The blocks B each also additionally comprise one of the concatenation checksums CRC, which is formed on the basis of the direct predecessor block. The first block B1 thus comprises a first concatenation checksum CRC1 from its predecessor block, the second block B2 comprises a second concatenation checksum CRC2 from the first block B1, and the third block B3 comprises a third concatenation checksum CRC3 from the second block B2.

The respective concatenation checksum CRC1, CRC2, CRC3 is formed using the block header of the corresponding preceding block. The concatenation checksums CRC can be formed using a cryptographic hash function such as SHA-256, KECCAK-256 or SHA-3, for example. By way of example, the concatenation checksum can also be calculated using the data block checksum or the header comprises the data block checksum (the data block checksum is explained below).

In addition, each of the blocks can comprise a data block checksum. This can be implemented using a hash tree, for example.

In order to create the hash tree, a transaction checksum (e.g., likewise a hash value) is calculated for each transaction of a data (block). As an alternative or in addition thereto, a transaction checksum, which was created by the creator of the transaction when creating the transaction, can be used for this purpose.

For a hash tree, use is usually made of, e.g., a Merkle Tree or Patricia Tree, the root hash value/root checksum of which is stored as a corresponding data block checksum in the respective blocks.

In one variant, the data block checksum is used as the concatenation checksum.

A block can furthermore have a time stamp, a digital signature, a proof-of-work record, as was explained in the embodiments of the present invention.

The blockchain BC itself is implemented using a blockchain infrastructure with a plurality of blockchain nodes (nodes N1, N2, N3, N4 and other blocks). The nodes can be blockchain oracles or trusted nodes, for example.

The nodes are communicatively connected to one another via the network NW1 (e.g., a communication network such as the Internet or an Ethernet network). By means of the blockchain infrastructure, at least some of the data blocks B or all data blocks B of the blockchain BC for example are replicated for some or all nodes of the blockchain.

The device and/or the write control module and/or the transmission apparatus and/or the verification device are can be, for example, as components of the distributed database system or in variants of a communication infrastructure (e.g., a peer-2-peer system, a distributed communication infrastructure). The device and/or the write control module and/or the transmission apparatus and/or the verification device can communicate with one another for example by means of the distributed database system or, in variants, by means of a communication infrastructure (e.g., a peer-2-peer system, a distributed communication infrastructure).

Figure 2:
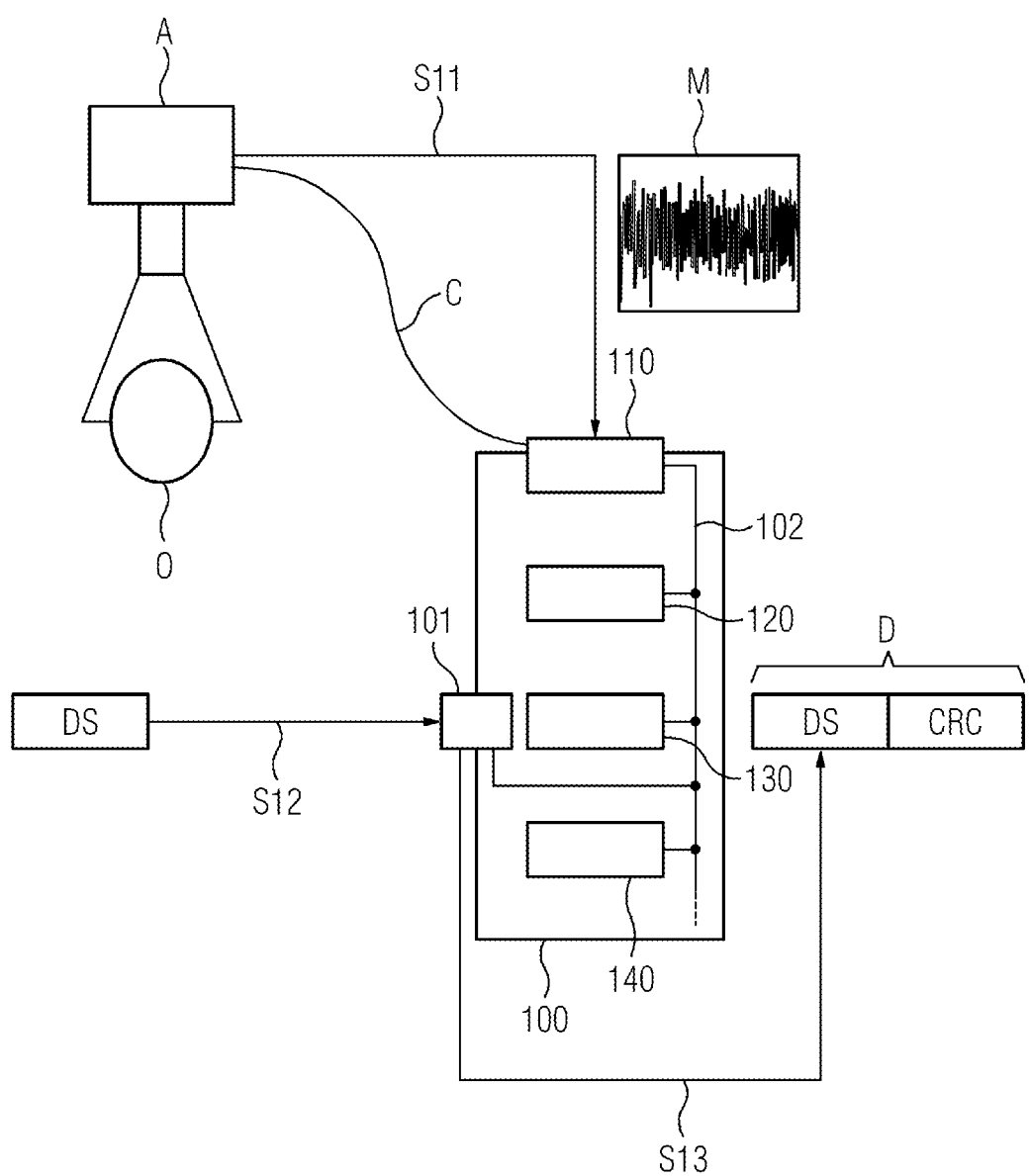
FIG. 2 depicts a further exemplary embodiment of the present invention.

FIG. 2 shows, in exemplary fashion using a further exemplary embodiment, the functionality of the device and also, in variants of the exemplary embodiment, the functionality of the verification device. The device and/or the verification device can be referred to as an apparatus, for example.

FIG. 2 shows a device 100 for calculating a cryptographic checksum CRC for a data structure DS, the data structure DS comprising object-specific data for an object O, for example. The data structure DS and the cryptographic checksum CRC are, for example, in a data record D, the data record D being stored, for example, as a transaction in the distributed database system. To this end, the transaction can comprise an additional checksum (e.g., a transaction checksum), which was generated for example by means of a cryptographic key (e.g., a private cryptographic key) assigned to an entity or is used by the latter. By way of example, the entity can be an operator, a measuring station or processing station that controls, processes or manages the object O. The data record D can also be a message or a transaction, depending for example on the implementation.

Depending on the implementation variant, the data structure DS can also correspond to the data record D, for example if the data structure DS comprises a data field for storing the cryptographic checksum CRC or the cryptographic checksum is appended to the data structure. As already explained, the data structure DS and/or the data record D, in particular, can be stored in a comprised by a message or a transaction. Alternatively, the data structure DS and/or the data record D, for example, can be a message or a transaction.

The nodes of the distributed database system (e.g., blockchain nodes) and/or the distributed database system can, for example, each additionally comprise one or more additional components, such as, for example, a processor, a storage unit, further communication interfaces (e.g., Ethernet, WLAN, USB, fieldbus, PCI), an input device, in particular a computer keyboard or a computer mouse, and a display device (e.g., a monitor). The processor can for example comprise a plurality of further processors, which can be used in particular to realize further exemplary embodiments.

By way of example, a node from FIG. 1 comprise the device 100 or be embodied as the device 100 or a node from FIG. 1 is connected to the device 100 via a data line or communication network. Analogously to this, for example, a verification device can also be embodied for verifying the cryptographic checksum CRC for a data structure DS.

To create the cryptographic checksum CRC, the device comprises a capture module 110, a calculation module 120, a cryptography module 130 and a protection module 130 and a communication module (e.g., a network interface) 101, which are communicatively connected to one another via a bus (e.g., a PCI bus, CAN bus, USB or data line) 102.

The capture module 110 is set up to capture individual features M of the object O by means of a capture device A. To this end, the capture device A is connected to the capture device A via a (wireless or wired) data connection C (e.g., via USB, LAN, W-LAN, Bluetooth, Firewire). By way of example, the capture device A captures/measures surface roughness as individual features for the object O by means of a scanning beam S.

The calculation module 120 is set up to calculate an object-specific characteristic on the basis of the individual features M. When calculating the object-specific characteristic, it is possible to take account of, for example, tolerance values in order to take account of, e.g., measurement inaccuracies of the capture device A in the ascertainment of the first cryptographic key mentioned below. The calculation module can be dispensed with for example in implementation variants in which the cryptographic key is provided on the basis of the individual features.

The cryptography module 130 is set up to provide a first cryptographic key on the basis of the individual features and/or the object-specific characteristic.

The provision can be implemented in different ways. By way of example, the individual features and/or the object-specific characteristic can be compared to reference values, with corresponding tolerance values being taken into account in this case, for example. If the individual features and/or the object-specific characteristic match the reference values (e.g., after taking the tolerance values into account), then the first cryptographic key is loaded, for example from a secure data memory. The reference value may be captured or stored, for example, during an initialization phase and/or installation phase of the device. The initialization phase and/or installation phase for the device can only be carried out once.

Alternatively, the first cryptographic key is calculated on the basis of the individual features and/or the object-specific characteristic by virtue of the individual features and/or the object-specific characteristic being used as input data for a key derivation function. Additional data can also be used here. By way of example, a character string (e.g., a secret password) can be linked with the individual features and/or the object-specific characteristic, in which case, for example, these linked data are then used to calculate the first cryptographic by means of a key derivation function (e.g., PBKDF2).

The protection module 140 is set up to cryptographically protect a data structure by means of the cryptographic checksum CRC, wherein the protection module calculates the cryptographic checksum by means of the first cryptographic key. The cryptographic checksum can, for example, using a keyed hash message authentication code (HMAC, e.g., using MD5, SHA1, SHA256). In further implementation variants, the cryptographic checksum can be realized as a digital signature or as a digital certificate, the first cryptographic key, for example, acting as a private key to generate the digital signature, depending on the cryptographic method used (symmetrical or asymmetrical method). To verify the digital signature, for example, the public key is derived from the first cryptographic key and provided by a trustworthy entity (e.g., a trustworthy server), this allowing the verification device, in variants thereof, to access the corresponding key. By way of example, if the private key has been generated and stored in a memory of the cryptography module 120, the corresponding individual features of the object, for example, can be changed or made unusable so that the first cryptographic key can no longer be derived. By way of example, this can be implemented by virtue of the corresponding position on the surface of the object being polished in the case of surface features, colors/particles being washed off the object (e.g., by means of solvents) or, in addition, colors/particles being applied to the object so as to render the corresponding individual features unusable or alter the latter. By way of example, it is also possible for the individual features to be rendered unusable in such a way that the first cryptographic key can no longer be calculated directly on the basis thereof but, taking into account tolerance values, the object-specific characteristic can still be calculated on the basis of the altered individual features in order, for example, to provide or calculate the public key by the cryptography module of the verification device.

As an alternative or in addition thereto, the public key can also be worked/introduced into or applied to the object as a (digital) fingerprint in the form of the individual features (e.g., surface roughness, a dye with a specific spectrum, which, for example, decays after a predetermined time, in particular to encode a shelf life). This fingerprint or the individual features cannot be determined, for example, with the naked eye and/or without knowledge of the type and position or can only be determined/read with considerable technical effort. Accordingly, the information to capture the individual features for example can be stored in a protected memory of the device so that this information cannot be accessed by unauthorized persons. The incorporated fingerprint/individual features can be, for example, surface roughness that is generated during the manufacture of the object or the further processing of the object. As an alternative or in addition thereto, the fingerprint can be realized by applying colors or particles, with the colors or particles, for example, being applied in such a way that an individual spectrum is generated for the object. To this end, different colors/particles, for example, can be distributed over the surface of the object such that, for example, a geometric spectrum is generated so that, e.g., a specified spectrum can be measured at certain positions of the object. By way of example, the spectrum or the colors/particles are chosen in such a way that they do not lie in the spectrum that is visible to the human eye. By way of example, this can be a spectrum that lies beyond 800 nm.

The use of tolerance values is advantageous to the effect of, for example, taking into account (or compensating) measurement inaccuracies when calculating the characteristic or capturing the individual features in order to calculate the object-specific characteristic or the individual features for the correct object, optionally in reproducible fashion.

By way of example, the tolerance values can be chosen in such a way that, given spectroscopic individual features of an object, e.g., in the form of food, no first cryptographic key is provided (or no valid first cryptographic key can be provided) if the object or the food is no longer fresh enough. By way of example, if the objects are bananas, the tolerance value for the spectrum of the surfaces of the bananas can be chosen in such a way that when the bananas turn brown over a large area, no first cryptographic key is provided or generated for these bananas (or no valid first cryptographic key can be provided). Accordingly, at a transport point or at an intermediary, the bananas or a banana delivery with these bananas can no longer be confirmed/stored as "fresh" in a supply chain by means of a message with the data structure or the data structure in the distributed database system. In the same way, other objects in the form of perishable goods, for example, can be monitored by means of messages/data structures in a distributed database system. The corresponding tolerance values are then chosen accordingly so that no first cryptographic key is provided if the perishable goods, e.g., have degenerated too much (e.g., the shelf life of food has expired or the food has spoiled). Alternatively, if the tolerance values are exceeded, for example, an alternative cryptographic key can be provided, on the basis of which it possible to trace the point in the documentation of the transport of the object at which the tolerance values were exceeded.

Accordingly, the specified tolerance values can be used not only for the object-specific characteristic, but also when the first cryptographic key is to be provided on the basis of the individual features. By way of example, this may be necessary if the individual features (which can also be referred to as object-specific features) should be compared to a reference value in order to release the first cryptographic key if there is a corresponding match, or if the individual features should serve as input parameters for a key derivation function and, for example, errors with regard to a reproducible key derivation due to measurement inaccuracies should be prevented.

The embodiment of the present invention can be used advantageously in supply chain management or when monitoring a supply chain, for example. Particularly if, for example, during the transport of objects (e.g., goods such as food, electronic components, precious parts, etc.), object-related data from the different entities (e.g., manufacturer, a plurality of logistics companies, sales, buyers), who, e.g., are involved in the manufacture, transport or sale of the object, are generated at different points in the fashioning/processing of the object and/or at different times for documentation reasons. If the entities involved do not trust each other, the present invention is particularly advantageous since the corresponding data are protected by, for example, the cryptographic checksum and/or a checksum of a corresponding entity. By way of example, the device can be part of a transport container for transporting food such as bananas or milk, for example, or there are a plurality of devices of the same type at the different points of fashioning/processing of the object or the times when this takes place.

By way of example, object-specific data (e.g., the nature of the object, type, manufacturer, unique identifier/UID, etc., time of arrival at the logistics company) are recorded and stored in an object data record or documentation data record at a processing location (e.g., handover of the object to the logistics company). The object data record/documentation data record can then in turn be stored in the data structure, for example, and, as already explained, be protected with the cryptographic checksum by virtue of the first cryptographic key being provided in accordance with the explanations. By way of example, it is also conceivable that two different groups of object-specific data are generated for an object, wherein, for example, a first data group and a second data group are each stored in a data structure (e.g., in a first data structure and a second data structure) to this end. A corresponding data structure can comprise a cryptographic key, for example, so that the cryptographic checksum (which can also be referred to as first cryptographic checksum) can be verified. Depending on the implementation variant, the data structure DS and/or the data record D can comprise the object data record and/or the documentation data record. By way of example, the object data record can correspond to the documentation data record in variants.

By way of example, the data groups comprise changeable data relating to the object and unchangeable data relating to the object. By way of example, the first data group/data structure comprises unchangeable data for the object; by way of example, these can specify the nature of object (electronic component, food, raw material such as diamonds), type, manufacturer, unique identifier/UID, etc.

By way of example, the second data group/data structure comprises changeable data for the object. This changeable data can be, e.g., the data (name, address, digital signature) of the entity that processes the object, time of processing, work steps, processing conditions (e.g., temperatures during transport/manufacture/processing of the object), duration of processing (e.g., duration of the transport, duration of the implementation of the processing steps, e.g., during the production of the object).

The first data structure and/or the second data structure are cryptographically protected by means of the first cryptographic key: by virtue of for example the cryptographic checksum being generated, for example in the form of a digital signature for the respective data structure. The corresponding data structures can then be stored by the corresponding processing entity in a message or a transaction in the distributed database system (e.g., a blockchain), with, for example, the corresponding entity generating a transaction checksum for the message or the transaction using a cryptographic key of the entity. The transaction checksum can in particular also be a digital signature.

This process of digital documentation is carried out, for example, by different entities at appropriate times when fashioning/processing/transport is carried out for the object. By way of example, it might also be possible that at predetermined times during transport corresponding messages/transactions with corresponding data relating to the object are protected by means of the cryptographic checksum in accordance with the explained method or one of its variants and, e.g., written into the distributed database system. To this end, the device can comprise a communication module (e.g., a mobile radio module such as a UMTS, LTE or 5G module), for example. This application is advantageous to document, e.g., the transport temperature for the object (e.g., milk or fish) during transport by means of the data relating to the object. In this case, the individual features of the object can be, for example, surface structures of the transport container or spectral data or a spectrum of the object.

By using the individual features for the provision of the first cryptographic key, a corresponding object, in particular a physical object, can be linked more closely by means of the "digital world". By way of example, if the object is transported for too long or changed by fashioning/processing/transport in such a way that, for example, the corresponding tolerance values are no longer observed, the tolerance values being exceeded or improper handling of the object can be substantiated without interruptions, for example via the distributed database system. In the process, it is also possible to substantiate whether the object was replaced by another object, for example, which is relevant in the case of counterfeit products, for example.

If the object were to be replaced by a counterfeit object, the corresponding individual characteristics would change. By way of example, this could be relevant to medical products, to find out in the case of a silicone implant, for example, whether the latter is actually a manufacturer's silicone implant or else an implant that has been counterfeited. To this end, the corresponding data for the object (implant) are written into the distributed database system according to one of the above-mentioned variants when the object is manufactured. Logistics companies, sales companies and clinics that transport, trade and implant the object each document the processing steps carried out by them, times and other relevant data (information on the respective entity), in each case according to the aforementioned method. The individual features of an implant can be, for example, surface features of the implant (e.g., surface of the silicone pad or the surface of a metallic implant). In the case of the silicone pad, for example, the individual features can also be a measured spectrum of the content (silicone) of the silicone pad. The present invention is not limited only to silicone pads. Other implants with other fillings can also be verified. This also enables the authenticity of other medical products such as drugs (e.g., using spectra) or medical devices such as MRIs, CTs and their electronic components (e.g., using test signals or noise signals).

This makes it possible to document when and where an object manipulation was carried out since the individual features change in such a case and this would optionally result in a change in the first cryptographic key. By way of example, if there is a first data structure object-unchangeable data, the digital signature would change in this case. By way of example, the digital signature would be the same for the first 3 entries. By way of example, if the fourth entity in the supply chain attempts to replace the implant with a counterfeit with inferior material, this would be documented by the embodiment of the present invention, for example. The fourth entity can still generate a correct entry in the distributed database system, but no later than when the forged object is processed by the fifth entity is it no longer possible to generate a correct digital signature/cryptographic checksum for a corresponding first data structure. The corresponding entities each also generate a corresponding second data structure, for example to store changeable data.

Since the respective entities each generate a transaction checksum with their own cryptographic key (the key of the entity) for their transaction(s) with the corresponding data structures, it may optionally be possible to determine the defrauding entity. While it is desirable for as much as possible about manufacturing/fashioning/distribution/processing/transport to be securely stored in data structures and transactions, it may also be sufficient if, e.g., only the manufacturer does this. A distributed database does not necessarily have to be used to this end. Other databases (e.g., hierarchical SQL databases) or a cloud service from a trustworthy entity can also be used.

By means of the embodiment of the present invention, for example, an object being ordered can lead to the manufacturer/seller immediately transmitting a corresponding data structure to the buyer or a corresponding data structure is transferred to the buyer after the object has been manufactured. In so doing, the corresponding data structure or the corresponding data structures (if a first and a second data structure are used) are protected by an appropriate cryptographic checksum, as described. The corresponding data structures can either be transmitted directly to the buyer or made available to the buyer by means of a database system (e.g., a distributed database system). If the object is delivered to the buyer, they can use the object and the data structures to verify if it is actually the object for which the seller/manufacturer has provided corresponding data structures or stored the latter in the database system.

To this end, they can, e.g., form a corresponding checksum for the data of the first data structure by virtue of the individual features of the object—as already explained—being captured and the first cryptographic key being provided on the basis of these individual features so that the corresponding cryptographic checksum can be generated. If the respective cryptographic checksums match, then it is in fact the object that was supplied by the manufacturer/seller and no manipulation took place on the transport route and/or intermediate distribution.

By way of example, it is possible for the individual features to encode a cryptographic key, which can be used, for example, to verify the cryptographic checksum of the data structure of the manufacturer/seller. To verify the data structure, a verification device as briefly explained below can be used, the functionality being implemented in a manner similar to that in the device already explained.

A verification device for verifying a cryptographic checksum of a data structure, comprising:
  for example a reception module for receiving a data structure, wherein the data structure is protected by means of a cryptographic checksum;
  for example a capture module (110) for capturing individual features (M) of an object (O) by means of a capture device (A);
  for example a calculation module (120) for calculating an object-specific characteristic on the basis of the individual features;
  for example a cryptography module (130) for providing a first cryptographic key on the basis of the individual features and/or the object-specific characteristic;
  for example a verification module (140) for verifying the cryptographic checksum by means of the first cryptographic key.

By way of example, depending on the verification, control data can be provided which, if the cryptographic checksum is correct, optionally confirm the authenticity of the object and, e.g., cause a manufacturing machine to further process the object further or cause a logistics system to transport the object onward.

The locations or information on how and where, the individual features for the device, for example can be found by the capture device can be determined at random, for example during production or at another point in time (e.g., to make manipulation of the features on the object more difficult). The corresponding configuration with the information on how and where the individual features are to be captured in this case comprises data about the geometric locations and/or interfaces where the capture device can record the individual features. This configuration is stored access-protected in the device or in the verification device. In this case, access-protected means that, for example, only an authorized person can access the data/configuration by optionally removing cryptographic and/or mechanical and/or electromechanical protection, for example by entering a password/pin. If someone wanted to read out the configuration through improper manipulation of the device, the corresponding device (or verification device) could capture this using appropriate sensors (e.g., protective film against drilling, temperature sensors, light sensors) and optionally delete the configuration from the device's memory.

The device and/or the verification device can also use different individual features, the individual features for the verification device encoding a predetermined key (for example, as a fingerprint). The different individual features are then situated at different positions on the object, for example.

Alternatively, the individual features cannot be determined randomly, but rather are situated in a known/assigned position in the case of a corresponding object (e.g., on the base of the object or in uneven areas of an implant).

In one variant, the device for calculating a cryptographic checksum can also dispense with the object-specific characteristic or its calculation. In this case, such a device comprises, for example, the following features:
  for example a capture module (110) for capturing individual features (M) of an object (O) by means of a capture device (A);
  for example a cryptography module (130) for providing a first cryptographic key on the basis of the individual features;
  for example a protection module (130) for cryptographically protecting a data structure by means of a cryptographic checksum, wherein the protection module calculates the cryptographic checksum by means of the first cryptographic key.

The device could also be used, for example, as a hardware wallet for blockchains or distributed ledger applications by virtue of, for example, the object being an electronic device that protects transactions using the cryptographic checksum (e.g., as a digital signature). To this end, for example, the object comprises the device and the capture device captures the individual features (e.g., object-specific noise signal or an object-specific signal) and generates the first cryptographic key so that the digital signature can be created. The data structure can be, for example, the message or the transaction that is to be protected. Once the data structure or the transaction, which comprises the transaction data requested by the user, has been created and protected by the digital signature, the digital signature is transferred to the distributed ledger/the distributed database. The latter can then, e.g., validate the corresponding transaction (which comprises the data structure, the transaction data and the digital signature). To this end, the device and/or the object comprises, e.g., an input interface to enter the transactions and/or an output interface to transmit the transaction to the distributed database system.

In one variant of the verification device, the individual features and/or the object-specific characteristic can be used to verify a cryptographic checksum. In this case, such a verification device comprises the following features:
- for example a reception module for receiving a data structure, wherein the data structure is protected by means of a cryptographic checksum;
- for example a capture module (110) for capturing individual features (M) of an object (O) by means of a capture device (A);
- for example a calculation module (120) for calculating an object-specific characteristic (I) on the basis of the individual features;
- for example a verification module (140) for verifying the first cryptographic checksum by means of the individual features and/or the object-specific characteristic, wherein
    - control data are provided, for example on the basis of the result of the verification,
    - a further cryptographic checksum for the data structure is generated, for example on the basis of the individual features and/or of the object-specific characteristic,
    - the data structure and/or the object is accepted as authentic and/or correct, for example in the case of a correspondence of the further cryptographic checks with the cryptographic checksum.

Corresponding methods can also be used in this variant to compensate measurement inaccuracies, for example by means of tolerance values. As already explained, this is done by appropriate preprocessing.

The individual features and/or the object-specific characteristic is used, for example, as a secret, for example in order to calculate a cryptographic checksum such as, for example, a message authentication code (MAC).

By way of example, for the purposes of verifying the data structure in this variant, another data structure that has been protected with a cryptographic checksum can be read, e.g., from a distributed database system. This other data structure was protected using, e.g., the individual features and/or the object-specific characteristic (of the same object) by virtue of having generated the cryptographic checksum for the other data structure on the basis of the individual features and/or the object-specific characteristic. By way of example, if the data structure content of the data structure and of the other data structure are identical, then the respective cryptographic checksums of the data structures match. By way of example, for this verification, the corresponding data structure content of the other data structure can be read in order to provide the corresponding data structure content. As an alternative or in addition thereto, only a cryptographic checksum, for example, can be provided for the data structure (e.g., by the distributed database system). This cryptographic checksum is then verified by virtue of again forming a cryptographic checksum for the data structure.

By way of example, if the cryptographic checksums match, the object is accepted as authentic or as an original and/or the data structure is accepted as authentic. If the checksums do not match, the object and/or the data structure is rejected and control commands and/or a control signal are optionally provided in order to, e.g., react to the rejection (e.g., the object is not processed, not transported onward or a person is informed to verify the object manually). The decision as to whether, for example, the object and/or the data structure are accepted as authentic depends on the relationship of trust in the test situation, for example. If the assumption is made that the object is trustworthy or an original, the authenticity of the data structure, for example, is determined with the aid of the object. If, for example, the data structure with its cryptographic checksum is trustworthy, the authenticity of the object can be determined.

Accordingly, a verification module can be set up to verify the cryptographic checksum by means of the first cryptographic key, the data structure and/or the object being accepted as authentic and/or correct and/or having integrity, for example if the cryptographic checksum is verified successfully.

One variant of the verification device comprises, for example, the following features:
- for example a reception module for receiving a data structure, wherein the data structure is protected by means of a cryptographic checksum;
- for example a capture module (110) for capturing individual features (M) of an object (O) by means of a capture device (A);
- for example a verification module (140) for verifying the cryptographic checksum by means of the individual features, wherein
    - control data are provided, for example on the basis of the result of the verification,
    - a further cryptographic checksum for the data structure is generated, for example on the basis of the individual feature,
    - the data structure and/or the object is accepted as authentic and/or correct and/or having integrity, for example in the case of a correspondence of the further cryptographic checks with the cryptographic checksum.

In one variant of the device, the individual features and/or the object-specific characteristic can be used to calculate a cryptographic checksum for a data structure. In this case, such a device comprises the following features:
- for example a capture module (110) for capturing individual features (M) of an object (O) by means of a capture device (A);
- for example a calculation module (120) for calculating an object-specific characteristic (I) on the basis of the individual features;
- for example, a protection module (130) for cryptographic protection of a data structure by means of a cryptographic checksum, wherein the protection module calculates the cryptographic checksum by means of the individual features and/or the object-specific characteristic.

Corresponding methods can also be used in this variant to compensate measurement inaccuracies, for example by means of tolerance values. As already explained, this is done by appropriate preprocessing.

The individual features and/or the object-specific characteristic is used, for example, as a secret, for example in order to calculate a cryptographic checksum such as, for example, a message authentication code (MAC).

Here, one there and the device can comprise the following features:
- for example a capture module (110) for capturing individual features (M) of an object (O) by means of a capture device (A);
- for example a protection module (130) for cryptographically protecting a data structure by means of a cryptographic checksum, wherein the protection module calculates the cryptographic checksum by means of the individual features.

It is possible, for example, that an allocation apparatus or an allocation system that, e.g., comprises a further memory for the ordered storage of data is used to optionally find, quickly if possible, the corresponding transactions in the distributed database system which already store data records for the object. By way of example, the device and/or the verification device can comprise an allocation apparatus or an allocation system in respective variants (the other exemplary embodiments in FIGS. 3 and 4 can also comprise an allocation apparatus or an allocation system in respective variants).

The allocation apparatus or the further memory can be, for example, a hash table, a hash map or a lookup table. The allocation apparatus or the allocation system can also implement a distributed hash table or the further memory corresponds to a distributed memory, for example in the form of the distributed hash table.

By way of example, if a data structure with a cryptographic checksum is written to or stored in the distributed database system by a message or transaction, an entry is written in the allocation apparatus, for example. The entry comprises a key and a transaction-specific data record. By way of example, the following data or a combination of the following data can be used as the key:
  individual features
  object-specific characteristic
  unchangeable object-related data (first data group)
  the first cryptographic key
  the cryptographic checksum
  a hash for the aforementioned data
  a hash value for the data structure In this context, the key can also be referred to as an allocation key.

By way of example, the transaction-specific data record can comprise the following data or a combination of the following data:
  block number of the block of a blockchain/distributed database system that comprises the transaction with the corresponding data structure
  transaction number of a transaction that comprises the transaction with the corresponding data structure
  storage location or storage address of a message that comprises the message with the corresponding data structure
  checksums of the corresponding block and/or transaction and/or message
  data about the entity that made the entry
  other data that may appear relevant In this case, transaction-specific data record can optionally also be referred to as metadata about the transaction or the entry in the distributed database. By way of example, an entry can be a transaction, message, data block, block or memory address that, e.g., stores the data structure with the corresponding cryptographic checksum.

If an entry is written in the distributed database system, an entry, for example, is created if there is no entry for a key and the corresponding transaction-specific data record is entered.

If an entry for a corresponding key already exists, then the associated transaction-specific data record, for example, can firstly be overwritten with the current transaction-specific data record. In other words, the already existing entry is overwritten by the transaction-specific data record that is to be entered. Alternatively, the current/new transaction-specific data record can be appended to the existing transaction-specific data record, with the transaction-specific data record being realized as a list or a vector with transaction-specific data records in such a variant. The transaction-specific data records can be written to the list or the vector sin order to or sorted fashion, for example, so that the most recent/latest transaction-specific data record is the first entry or the last entry, for example. Accordingly, the list/vector is sorted according to the time of entry, for example. Other sorts or orders are also possible here. By way of example, the entries can be sorted according to the localities, postcodes, GPS positions, etc. The transaction-specific data record or the transaction-specific data records can also be referred to as, for example, metadata for corresponding data structures which, for example, can be stored and/or provided by a distributed database system.

With the allocation apparatus, it is possible to quickly find the respective entries that are allocated to an object within the distributed database system. First, the corresponding key for an object is generated, for example by virtue of the individual features and/or the property-specific characteristic being captured or calculated. The corresponding data for determining the key can then be calculated on the basis of this data.

If the key is available/provided, the corresponding transaction-specific data record can be read via the allocation apparatus or the allocation system. On the basis of this transaction-specific data record, the corresponding entries/transactions in the distributed database system can then optionally be read out. By way of example, in this way it is possible to very quickly find the corresponding transactions with a data structure that were entered for the object by another entity or at an earlier point in time. This is advantageous if the authenticity for the object and/or the (current) data structure should be verified with the verification device using an earlier/older data structure (e.g., a data structure that was written to the distributed database system by another entity). As already mentioned, corresponding data structures are protected with respective cryptographic checksums, as has already been described in this or other exemplary embodiments.

In this case, an allocation device or an allocation system can comprise the following:
  for example a key provision module, wherein
    for example the key provision module is set up to provide a key,
    for example the key is calculated on the basis of input data, or
    for example, the key is retrieved via a data interface or transferred to the key provision module
  for example a metadata provision module, wherein
    for example the metadata provision module is set up to provide metadata for an entry in a database (e.g., a distributed database system),
    for example, the metadata are calculated by the metadata provision module, for example by virtue of transferring a reference or a link to the entry to the metadata provision module and, for example, the metadata provision module reading the corresponding metadata for the entry from the database, or
    for example the metadata can be retrieved from the metadata provision module via a data interface or transferred to the metadata provision module
  for example a memory module, wherein
    the memory module is set up to store a data pair consisting of a key and corresponding metadata.

A device and a verification device are explained below, each of which comprises a corresponding allocation apparatus or an allocation system. In this context, comprises can be understood broadly, for example, so that a corresponding allocation apparatus or an allocation system is also connected to a device or a verification device via a communication interface/data interface (e.g. Ethernet, LAN, mobile radio interface). Alternatively, a device and/or verification device comprises a corresponding allocation apparatus or an allocation system as an integral component. Alternatively, a corresponding allocation apparatus or an allocation system is embodied as one or more nodes of the distributed database system.

In this variant, a device comprises the following:
for example a capture module for capturing individual features of an object by means of a capture device;
for example a calculation module for calculating an object-specific characteristic on the basis of the individual features;
for example a cryptography module for providing a first cryptographic key on the basis of the individual features and/or the object-specific characteristic;
for example a protection module for cryptographically protecting a data structure by means of a cryptographic checksum, wherein the protection module calculates the cryptographic checksum by means of the first cryptographic key;
for example a write module, wherein
for example the write module is set up to write the data structure to a database (e.g., a distributed database system),
for example, the write module forms a key (e.g., also referred to as an allocation key) for an entry in the database that, e.g., comprises the data structure (the data structure was stored in this entry),
for example the write module writes metadata about the entry in the database to an allocation apparatus by means of the key.

In a further variant, a device comprises the following:
for example a capture module for capturing individual features of an object by means of a capture device;
for example a cryptography module for providing a first cryptographic key on the basis of the individual features and/or an object-specific characteristic;
for example a protection module for cryptographically protecting a data structure by means of a cryptographic checksum, wherein the protection module calculates the cryptographic checksum by means of the first cryptographic key;
for example a write module, wherein
for example the write module is set up to write the data structure to a database (e.g., a distributed database system),
for example, the write module forms a key (e.g., also referred to as an allocation key) for an entry in the database that, e.g., comprises the data structure (the data structure was stored in this entry),
for example the write module writes metadata about the entry in the database to an allocation apparatus by means of the key.

In a further variant, a device comprises the following:
for example a capture module for capturing individual features of an object by means of a capture device;
for example, a protection module for cryptographic protection of a data structure by means of a cryptographic checksum, wherein the protection module calculates the cryptographic checksum by means of the individual features and/or the object-specific features;
for example a write module, wherein
for example the write module is set up to write the data structure to a database (e.g., a distributed database system),
for example, the write module forms a key (e.g., also referred to as an allocation key) for an entry in the database that, e.g., comprises the data structure,
for example the write module writes metadata about the entry in the database to an allocation apparatus by means of the key.

In this variant, a verification device comprises the following:
for example a reception module for receiving a data structure, wherein the data structure is protected by means of a cryptographic checksum;
for example a capture module (110) for capturing individual features (M) of an object (O) by means of a capture device (A);
for example a calculation module (120) for calculating an object-specific characteristic on the basis of the individual features;
for example a cryptography module (130) for providing a first cryptographic key on the basis of the individual features and/or the object-specific characteristic;
for example a verification module (130) for verifying the cryptographic checksum by means of the first cryptographic key, wherein
for example the verification module forms a key (e.g., also referred to as an allocation key) for the data structure and/or for the object,
for example the verification module is set up to use the key to load metadata for an entry in a database (e.g., a distributed database system) from an allocation apparatus,
for example, another data structure and/or another cryptographic checksum is loaded from the database using the metadata for the entry,
for example the verification is implemented by virtue of the further cryptographic checksum being compared to the cryptographic checksum.

By way of example, the data structure and/or the object is accepted as authentic if the corresponding checksums match.

In a further variant, a verification device comprises the following:
for example a capture module (110) for capturing individual features (M) of an object (O) by means of a capture device (A);
for example a cryptography module (130) for providing a first cryptographic key on the basis of the individual features;
for example a verification module (130) for verifying a cryptographic checksum of a data structure by means of the first cryptographic key.

In a further variant, a verification device comprises the following:
for example a capture module (110) for capturing individual features (M) of an object (O) by means of a capture device (A);
for example a cryptography module (130) for providing a first cryptographic key on the basis of the individual features;
for example a verification module (130) for verifying a cryptographic checksum of a data structure by means of the first cryptographic key, wherein for example the verification module forms a key (e.g., also referred to as an allocation key) for the data structure and/or for the object, for example the verification module is set up to use the key to load metadata for an entry in a database (e.g., a distributed database system) from an allocation apparatus, for example, another data structure and/or another cryptographic checksum is loaded from the database using the metadata for the entry, for example the verification is implemented by virtue of the further cryptographic checksum being compared to the cryptographic checksum.

In a further variant, a verification device comprises the following:

for example a capture module (110) for capturing individual features (M) of an object (O) by means of a capture device (A);

for example a verification module (130) set up to verify a cryptographic checksum of a data structure, wherein for example the verification module forms a key (e.g., also referred to as an allocation key) for the data structure and/or for the object, for example the verification module is set up to use the key to load metadata for an entry in a database (e.g., a distributed database system) from an allocation apparatus, for example, another data structure and/or another cryptographic checksum is loaded from the database using the metadata for the entry, for example the verification is implemented by virtue of the further cryptographic checksum being compared to the cryptographic checksum.

In a further variant, a verification device comprises the following:

for example a verification module (130) set up to verify a cryptographic checksum of a data structure, wherein for example the verification module forms a key (e.g., also referred to as an allocation key) for the data structure and/or for the object, for example the verification module is set up to use the key to load metadata for an entry in a database (e.g., a distributed database system) from an allocation apparatus, for example, another data structure and/or another cryptographic checksum is loaded from the database using the metadata for the entry, for example the verification is implemented by virtue of the further cryptographic checksum being compared to the cryptographic checksum.

In a further variant, a verification device comprises the following:

for example a capture module (110) for capturing individual features (M) of an object (O) by means of a capture device (A);

for example a verification module (130) set up to verify a cryptographic checksum of a data structure, wherein for example the verification module forms a key (e.g., also referred to as an allocation key) for the data structure and/or for the object on the basis of the individual features (M) and/or an object-specific characteristic, for example the verification module is set up to use the key to load metadata for an entry in a database (e.g., a distributed database system) from an allocation apparatus, for example, another data structure and/or another cryptographic checksum is loaded from the database using the metadata for the entry, for example the verification is implemented by virtue of the further cryptographic checksum being compared to the cryptographic checksum.

The corresponding cryptographic checksum can be written instead of the data structure in the aforementioned embodiments and variants, for example depending on the chosen implementation. The data structure can be stored in another storage system in order, for example, to store the smallest possible data volume in the distributed database system. In other words, the data structure can also be stored indirectly, for example, in the distributed database system by virtue of, for example, the transaction in the database system the cryptographic checksum and a corresponding reference to the storage location in the other storage system (e.g., a database).

By way of example, methods which allow the trustworthy storage of messages/transactions can be used instead of the distributed database system.

By way of example, in this context with the embodiment of the present invention and the exemplary embodiments, embodiments and the variants thereof, trustworthy databases, cloud services, revision-proof storage systems (e.g., revision-proof databases), network communication systems (e.g., Ethernet communication systems, TCP-IP communication systems, mobile radio communication systems), distributed systems, distributed storage systems or peer-2-peer systems can be used to store and/or transfer the corresponding transactions/messages in a trustworthy manner and/or to exchange them between nodes. A write-protected memory, in which a transaction or message written once is stored in an unchangeable manner, could also be used, for example, to store a transaction or message using the method described, the corresponding message comprising a corresponding data structure with the cryptographic checksum and the transaction/message being optionally protected with a transaction checksum.

Different methods can also be used, for example, for the different checksums or cryptographic checksums. By way of example, the transaction checksum (or the message checksum in the case of a message) can be realized as a digital signature and the cryptographic checksum for the data structure is, for example, a message authentication code (MAC). Alternatively, the data structure with the cryptographic checksum can realize a digital certificate for the object, by virtue for example of object-specific information/data being stored in the data structure and/or the individual features and/or the object-specific characteristic being stored in the data structure.

In particular in combination with the verification device, a link with the object or individual features of the object (in particular a physical object, which can also be referred to as a non-digital object) and a digital twin or image representation of the object can be achieved by means of cryptographic means.

As a result of the message or the data structure that is protected by the device by means of the cryptographic checksum being stored invariably in a corresponding storage system (e.g., distributed database system or one of the alternatives mentioned) by means of a transaction for example, the verification device can verify by means of the ascertained first cryptographic key, optionally in a simple manner, whether this actually is the object used by the device.

The device and/or the verification device and/or the allocation apparatus and/or the allocation system can, for example, each additionally comprise one or more additional components, such as, for example, a processor, a storage unit, further communication interfaces (e.g., Ethernet, WLAN, USB, fieldbus, PCI), an input device, in particular a computer keyboard or a computer mouse, and a display device (e.g., a monitor). The processor can for example comprise a plurality of further processors, which can be used in particular to realize further exemplary embodiments.

An exemplary embodiment not shown in a figure relates to a system which comprises a device and a verification device. The respective device and/or the respective verification device can also be, for example, an embodiment, an exemplary embodiment or a variant of the respective device and/or the respective verification device.

Figure 3:
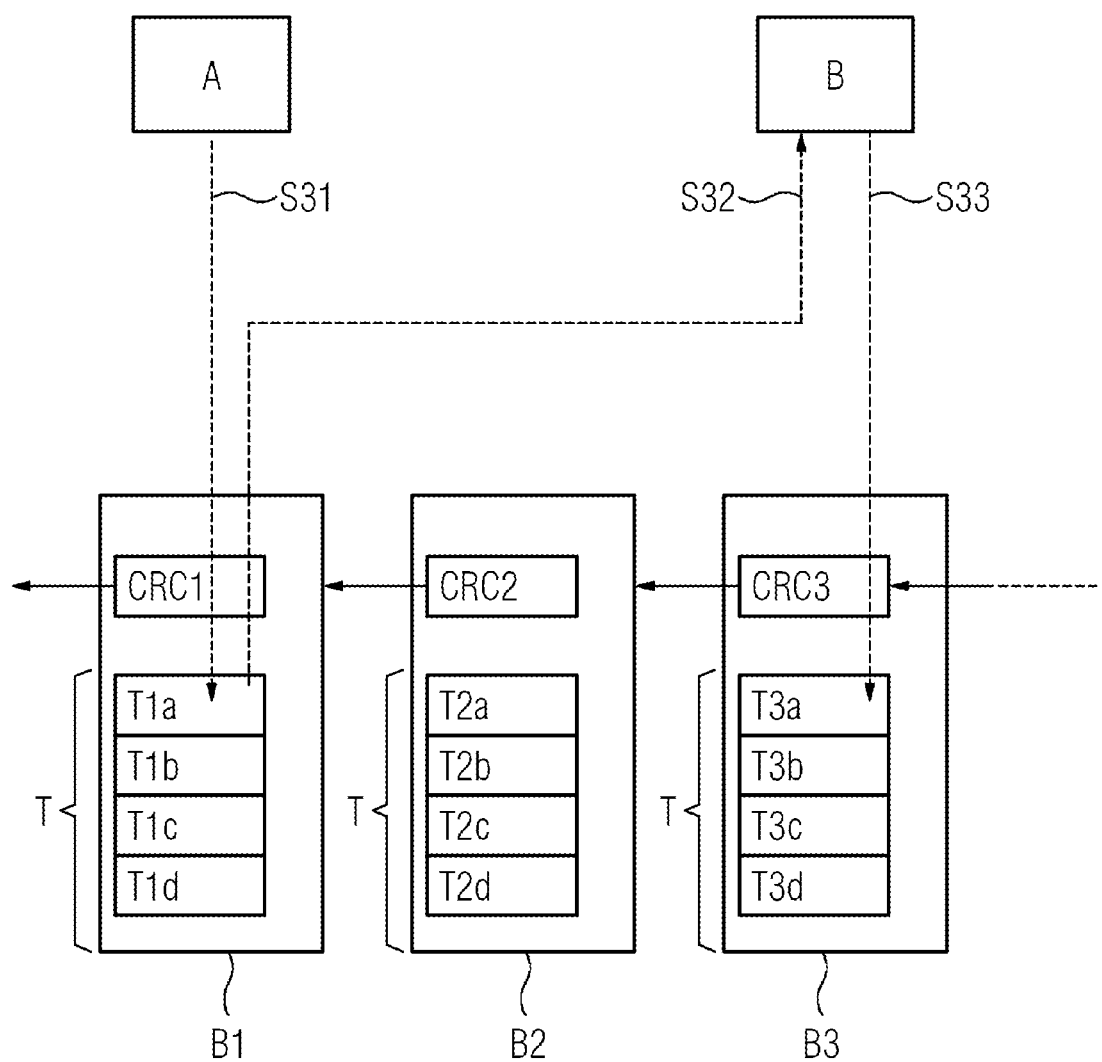
FIG. 3 depicts a further exemplary embodiment of the present invention.

FIG. 3 shows an exemplary embodiment relating to a write control module. By way of example, the write control module can be used to ensure that the data structure explained with respect to FIG. 2 is written to a distributed database system or database system meeting specified security requirements, the latter being prescribed in a data write configuration, for example. The exemplary embodiment of the present invention is explained in particular using FIG. 1 and the explanations of the reference signs from FIG. 1 also apply accordingly to FIG. 3.

The write control module comprises a communication interface (e.g., a network card), a verification module and a transfer control module, which are communicatively connected to one another via the bus.

The communication interface is set up to transfer messages, wherein the messages are transferred to a distributed database system for example.

The verification module is set up to load a data write configuration/the data write configuration, wherein the data write configuration specifies the conditions under which the messages are written to the distributed database system. In the process, the verification module for example verifies whether the conditions for writing the messages to the distributed database system are met. By way of example, the data write configuration can be stored in the write control module or stored in the distributed database system.

The transfer control module is set up to control a transfer of a message to the distributed database system by means of the communication interface on the basis of a check result of the verification module.

In variants of the aforementioned embodiment of the present invention, the distributed database system can be replaced by one of the alternatives mentioned in FIG. 2, for example.

The following explains how the data write configuration conditions are used to ensure that, for example, the corresponding message is only written once a corresponding other node has already written a message to the distributed database system.

To this end, the data write configuration for example specifies that one or more specified nodes have already written messages to the distributed database system, with the conditions of the data write configuration, for example, specifying that messages from the nodes are already present in the advantageous database system.

The messages can be transactions with a data structure that was explained in FIG. 2, for example. The nodes can be entities or blockchain oracles for which there is a dependency by means of the data write configuration, which for example also exists in the physical world. By way of example, a sequence of checkpoints should be adhered to when transporting the object from FIG. 2, with each checkpoint writing a corresponding transaction/message, for example with a data structure that is protected by means of the cryptographic checksum, to the distributed database system.

A first node A writes, e.g., a transaction (e.g., transaction T1a) to the distributed database system in a first processing step S31. In this case, the first node A can be a node that confirms the dispatch and/or manufacture and/or execution of a fashioning/processing step (object was created, for example, by a first subcontractor and handed over to the supplier) for the object. A second node B with a write control module reads the transaction T1a when processing the object at a second subcontractor (e.g., the object becomes—for example a workpiece) or searches the distributed database system for a transaction that was written by the first node with a reference to the object. This then takes place in processing step S32.

The data write configuration specifies, for example, what data from which node must be present in the distributed database system so that the second node or the write control module allows another message to be written to the distributed database system. The data write configuration can alternatively or additionally specify a time window that the messages from a given node must observe. By way of example, the data write configuration specifies that corresponding messages from a node must not be older than 24 hours (or else alternatively 1 hour, 5 minutes). Using this information, the second node B can then search through the corresponding entries/transactions in the distributed database system, with each entry/transaction comprising a time stamp. As an alternative or in addition thereto, a block can also comprise a time stamp. The corresponding time stamp is then used to ascertain which blocks/transactions are to be searched and/or whether the condition of the data write configuration is met. Additional information can also be used to find the relevant messages. These are, for example, object-specific data or the data of the data structures from FIG. 2.

If the conditions or requirements of the data write configuration are met, then the second node B, for example, writes a corresponding message in a processing step S33, for example a message or transaction with a data structure that is protected by means of a cryptographic checksum, to the distributed database system. The message can then be transaction T3a, for example.

The write control module can, for example, each additionally comprise one or more additional components, such as, for example, a processor, a storage unit, further communication interfaces (e.g., Ethernet, WLAN, USB, fieldbus, PCI), an input device, in particular a computer keyboard or a computer mouse, and a display device (e.g., a monitor). The processor can for example comprise a plurality of further processors, which can be used in particular to realize further exemplary embodiments.

Figure 4:
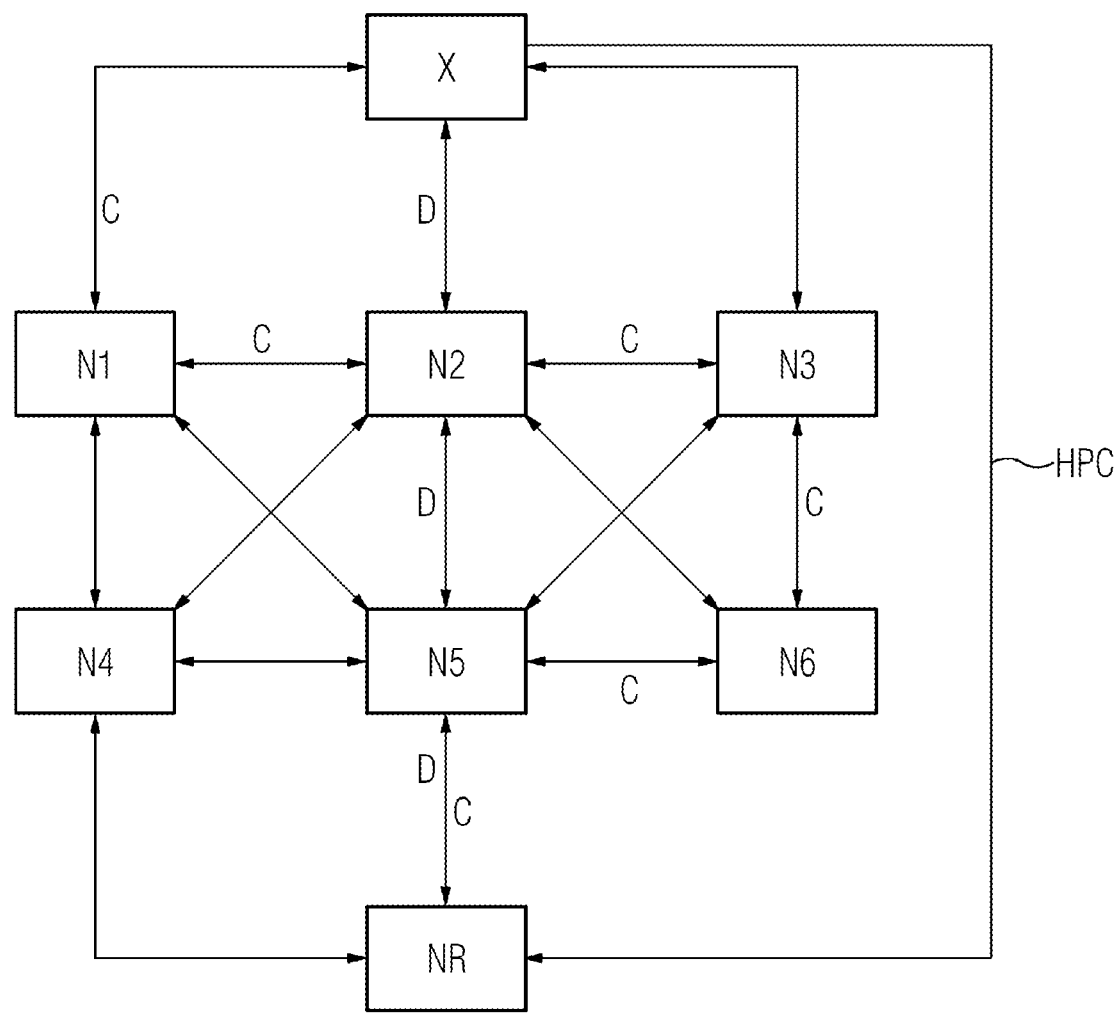
FIG. 4 depicts a further exemplary embodiment of the present invention.

FIG. 4 shows an exemplary embodiment relating to a transmission apparatus. A node from the distributed database system from FIG. 1 or a node from FIG. 2 or 3 can comprise the transmission apparatus, for example depending on the application scenario. By way of example, a node or a stand-alone apparatus can comprise the device and/or the write control module and/or the verification device and/or the transmission apparatus. By way of example, such a node or apparatus can also comprise corresponding explained variants, embodiments and exemplary embodiments of these embodiment of the present inventions (device and/or the write control module and/or the verification and device and/or the transmission apparatus).

The transmission apparatus comprises a message data capture module (e.g., a network card connected to a network card), a determination module and a transfer module, which are communicatively connected to one another via a bus.

The message data capture module is set up to read a priority data record with a priority from a message. The message can, in particular, be a message or a transaction that comprises a data structure with a cryptographic checksum, as was explained with respect to FIG. 2, for example. In this case, the priority or the priority data record can be specified by the device from FIG. 2, for example. As an alternative or in addition thereto, the message was generated by another device. The device can be, for example, a manufacturing machine or a control or monitoring device of a technical system (e.g., a power plant, an energy distribution network, a field device). The message or the data structure can comprise, for example, control commands for controlling further devices in order, for example, to control sensor values of a monitoring device, a switch signal of a controller or further processing steps for the object (e.g., a workpiece such as a turbine blade, generator part, a field device, etc.) during its manufacture and/or maintenance. The aforementioned variants of the message creator can be called sender X, for example.

The message data capture module reads a destination NR (e.g., a node of a distributed database system as illustrated, for example, in FIG. 1 or another device that processes the message) of the message; to this end, the message comprises a destination address (a UID or a network address) or other information (name, device type for the message) to determine a destination address of the destination NR (which can also be referred to as the recipient). Additionally, the priority is assigned transmission parameters for the message transmission, for example. This means, for example, the following:

Priority 0: low priority, no transmission times for the message need to be observed and/or successful delivery is not absolutely necessary. The transmission can take place, for example, as a broadcast or multicast.

Priority 1: normal priority, the message should be transmitted to the destination NR within a specified transmission time (e.g., 5 minutes, 1 hour, 5 hours).

Priority 2: high priority, the message should be transmitted to the destination NR more quickly than messages with normal or low priority (e.g., within 5 or 10 seconds). To this end, processing of a message with a lower priority by the nodes may optionally be interrupted (e.g., during a replication process within the distributed database system) and the message with the high priority will be processed.

Priority 3: critical priority, such a message must be transferred to the destination NR as quickly as possible.

The assignment of the transmission parameters can be specified by the distributed database system by virtue of the latter being configured, for example, by means of a smart contract/chain code.

The allocation or configuration of the transmission parameters can the implemented locally, for example, by virtue of a corresponding configuration being stored in the transmission apparatus. Alternatively or additionally, the transmission parameters can be assigned or configured, for example, by the distributed database system, for example by implementing a corresponding control using a smart contract that is stored, for example, in a transaction of the distributed database system.

The determination module is set up to use the destination and the priority to generate a message control data record for controlling the transfer of the message, the message control data record being assigned to the message. In particular, the transmission parameters are taken into account in the determination.

As an alternative or in addition thereto, the determination module is set up to use the destination and the priority to verify whether a valid route is able to be ascertained, with a message control data record for controlling the transfer of the message being generated, for example, depending on the result of the check. In particular, the transmission parameters are likewise taken into account during the determination.

The message control data record can, for example, be append to the message and thus form part of this message and/or the message control data record is assigned to the message via a UID (e.g., a random number, a hash value, a message number, the first cryptographic key from FIG. 2, the cryptographic checksum from FIG. 2, etc.) and stored separately in the distributed database system (e.g., as a hash map, hash table or as a lookup table).

The transmission module is set up to transmit the message depending on the message control data record to a node of the distributed database system (e.g., the distributed database system that was already explained in the preceding exemplary embodiments), the node being specified by the message control data record.

By way of example, the message control data record comprises a route over a plurality of nodes of the distributed database system, wherein for example to ascertain the route, the transmission time of messages between the nodes is transferred by the nodes to the transmission apparatus and, in particular, the corresponding transmission times are taken into account when ascertaining the message control data record. Here, the route is determined, for example, on the basis of the result of checking the priority and the transmission times by the determination module when ascertaining the message control data record.

As illustrated in FIG. 4, the message is transferred to the destination NR via a distributed system (e.g., the distributed database system) and its nodes (e.g., nodes N1-N6). By way of example, if this is a message with a low priority, route C (X, N1, N2, N3, N6, N5, NR) as calculated by the determination module is defined or calculated for the message by means of the message control data record. Different parameters can be used to choose the route; by way of example, the transfer times between the nodes are known by virtue of capturing these transfer times in the case of transfers between the nodes and exchanging said times between the nodes. Additionally, such a slow route can also be chosen for messages with low priority in order to keep a fast route free for messages with high priority. The nodes of route C can be, for example, slow nodes with a poorer network connection.

The node to which the transfer module transmits the message on the basis of the message control data record is the corresponding next node in the calculated route. Starting from sender X, the next node would be N1 for route C. Starting from node N1, the next node would be N2 for route C if node N1 has just processed the message and/or determined the route and/or determined and/or verified new ones.

If another message with high priority is sent, route D (X, N2, N5, NR) for example can be specified therefor. By way of example, if both messages arrive at node N2 simultaneously, the message with a higher priority is processed first by node N2.

A node (e.g., node N2), a plurality of nodes (e.g., nodes N1 to N3), all nodes (N1 to N6), the destination NR and/or the send or X can also comprise a corresponding transmission apparatus. This is advantageous to optionally adapt the route of the message for example if the transfer time of the chosen route deteriorates in such a way that said message does not arrive in time at the destination NR in accordance with its priority. Corresponding nodes can also verify the route to determine whether they still meet the requirements of the transmission parameters for the priority of the message. If it is determined in the process that the current route no longer meets these priority requirements or the transmission parameters, a corresponding node can adapt the route so that the latter meets the requirements again (and, for example, even uses a separate and/or direct communication channel if no valid route is able to be ascertained). If the current route still meets the requirements, the node does not adapt the route.

The message control data record can also comprise a configuration data record, for example. In the process, for example there is verification as to whether the message is transferred in such a way that it observes with the specifications of the priority and/or transmission parameters (e.g., transferred in timely fashion). Depending on this result of the check, the configuration data is then generated, which either specifies a route or generates a separate and/or direct communication channel HPC, for example if a message has a critical priority (e.g., a control message for an emergency shutdown of a manufacturing device), and optionally transfers the messages directly to the destination NR. The transmission module, for example, is then configured by means of the configuration data record in such a way that the separate and/or direct communication channel HPC to the destination NR is set up for transferring the message.

By way of example, the message control data record can additionally comprise a preconfigured data record which at least partially specifies the transfer path or route of the message to the destination.

If the distributed database system is, for example, a blockchain or a distributed ledger, then for example the validation process of messages, which are for example unvalidated transactions, can be adapted on the basis of the priority. By way of example, in the case of an implementation using a proof-of-work algorithm, the difficulty of the cryptographic puzzle can be adapted depending on the priority. For messages with high priority, e.g., the difficulty in solving the cryptographic puzzle of the proof-of-work algorithm is, e.g., adapted in this case in such a way that the time specifications of the priority for the transfer to the destination are not exceeded. To this end, the duration of the solution of the cryptographic puzzle can be adapted in such a way that the transmission times/transfer times via the nodes (e.g., nodes N1-N6) of the distributed database system to the target NR+the time required to solve the cryptographic puzzle does not exceed the time specification. By way of example, a buffer time optionally can also be taken into account for this purpose.

The difficulty of the cryptographic puzzle is therefore given by the time it takes to solve this puzzle. The time is determined as follows:

Time to solve the puzzle=(time specification for the priority)−(estimated transfer time to target+buffer time)

In this case, buffer time can be determined by the maximum expected deviation of the transfer time. If no buffer time is used, this can be 0, for example. This deviation can be captured by for example the nodes during message transfers and exchanged between the nodes.

By reducing the difficulty of the cryptographic puzzle, the message that, e.g., is a transaction is optionally made available more quickly than a validated transaction of the distributed database system.

Additionally or alternatively, a message with a critical priority can be transferred to the destination NR by means of the separate and/or direct communication channel HPC, for example.

The transmission device is advantageous to the effect of, for example, facilitating a fast transfer for the corresponding message to the destination without using the replication mechanism of the distributed database system and, for example, only documenting the receipt of the message by means of a confirmation transaction and/or documenting the sending of the message by means of a corresponding send transaction. This is advantageous, for example, for transferring the message to the destination as quickly as possible (e.g., in the case of critical priority), but still documenting the transfer and receipt securely through the distributed database system by way of the confirmation transaction and/or the send transaction. For this purpose, the send transaction comprises, for example, send date and/or send time and/or destination (e.g., destination address), a confirmation of the establishment of a connection to the destination and/or a confirmation of the transfer to the destination, wherein the confirmation of the transfer was confirmed by for example the destination by a checksum such as a digital signature by means of a corresponding confirmation message to the transmission apparatus (this confirmation message can optionally also be stored in the send transaction). The confirmation transaction, for example, can be structured analogously. The latter comprises, for example, such that reception date and/or reception time and/or transmission address (e.g., the address of the transmission apparatus), a confirmation of the establishment of a connection from the transmitter and/or a confirmation of the transfer from the transmitter, wherein the confirmation of the transfer was confirmed e.g., by the transmitter by a checksum such as a digital signature by means of a corresponding confirmation message to the transmission apparatus (this confirmation message can optionally also be stored in the send transaction). The message itself can again be protected by means of a transaction checksum, for example. The content of the message can also be stored in the confirmation transaction, for example.

In variants of the exemplary embodiment, a confirmation transaction is stored in the distributed database system after the destination has received the message.

The transmission apparatus is advantageous to the effect of, for example, documenting how fast the data transfer for messages to a destination takes place. In the process, the respective transfer times between the individual nodes of the distributed database system, for example, can be documented. Using the confirmation transactions, the transmission apparatus can then calculate the appropriate route through the infrastructure of the distributed database system for the priority.

The transmission apparatus can, for example, additionally comprise one or more additional components, such as, for example, a processor, a storage unit, further communication interfaces (e.g., Ethernet, WLAN, USB, fieldbus, PCI), an input device, in particular a computer keyboard or a computer mouse, and a display device (e.g., a monitor). The processor can for example comprise a plurality of further processors, which can be used in particular to realize further exemplary embodiments.

The embodiment of the present invention is advantageous to the effect of, for example, realizing a control system for manufacturing devices, infrastructure (e.g., waterworks, sewage control, building control) or power plants by means of a distributed database system, wherein messages, which optically are transactions of the distributed database system. What is particularly advantageous here is that the transfer time and/or the time for solving the proof-of-work record can be adapted to messages with different priorities. As a result, in particular a message with critical priority can be stored or made available more quickly than a validated message/transaction by the distributed database system. By way of example, if an emergency switch for a power plant is actuated, this switch sends a corresponding message with control commands for emergency shutdown to the power plant control, so that that switches off all relevant machines and devices of the power plant via a communication network. If the power plant control is implemented by means of a distributed database system, this corresponding message is transferred to the relevant machines and devices much faster by way of the present invention.

A control of an energy supply network can optionally be realized in an analogous way, for example if voltage peaks or voltage drops in the network are measured by a sender X or a device with appropriate sensor equipment. The sender X then sends a message with corresponding control commands and/or measurement values to field devices and/or controllers and/or reserve power plants of the energy supply network in order to compensate the corresponding voltage fluctuations in the energy supply network to the best possible extent by control by means of the field devices and/or the controllers and/or the reserve power plants. These messages then comprise a priority data record with a high or critical priority, the level of priority being determined for example by the strength of the voltage fluctuation in the energy supply network.

In one variant, the transmission apparatus for controlling a transmission of a message comprises the following:
for example a message data capture module, wherein
for example the message data capture module reads a priority data record with a priority from a message,
for example the message data capture module reads a destination of the message,
for example the priority is assigned transmission parameters for the message transmission;
for example a determination module, wherein
for example the determination module generates a message control data record for controlling the transfer of the message on the basis of the destination and the priority,
for example the message control data record is assigned to the message,
for example a transfer module, wherein
for example the transfer module transmits the message to a node of a distributed database system depending on the message control data record,
for example the node is specified by the message control data record.

In variants of the aforementioned embodiment of the present invention, the distributed database system can be replaced by one of the alternatives mentioned in FIG. 2, for example.

The device and/or write control module and/or transmission apparatus of FIGS. 2-4 can be combined in an integral apparatus or a system.

In this case, the system for example additionally comprises a generation module for generating messages for an object, the message comprising, for example, a priority data record with a priority and/or a data structure, as described in the exemplary embodiments and the variants thereof in FIGS. 2-4.

By way of example, the generation module can additionally comprise a sensor or access the capture device of the device in order to capture sensor data. By way of example, the sensor data about the object can be captured and, for example, stored in the data structure (second group of data/changeable data or first group of data/unchangeable data). By way of example, the type of sensor values (e.g., actuation of an emergency switch) defines the destination for the message and, in particular, the latter is stored in a corresponding message as a result thereof. As an alternative or in addition thereto, the generation device defines the destination of the message.

In this case, the system can comprise the following:
for example a generation module for generating messages for an object, wherein the message for example comprises a priority data record with a priority and/or a data structure;
for example a device for calculating a cryptographic checksum for the data structure, comprising:
for example a capture module (110) for capturing individual features (M) of the object (O) by means of a capture device (A);
for example a calculation module (120) for calculating an object-specific characteristic on the basis of the individual features;
for example a cryptography module (130) for providing a cryptographic key on the basis of the individual features and/or the object-specific characteristic;
for example a protection module (130) for cryptographically protecting the data structure by means of a cryptographic checksum, wherein the protection module calculates the cryptographic checksum by means of the cryptographic key;
for example a write control module, comprising:
for example a communication interface for transferring messages, wherein the messages are transferred to a distributed database system for example;
for example a verification module, wherein
for example the verification module loads a data write configuration that specifies the conditions under which the messages are written to the distributed database system,
for example the verification module verifies whether the conditions for writing the messages to the distributed database system are met;
for example a transfer control module, wherein
for example the transfer control module controls a transfer of a message to the distributed database system by means of the communication interface on the basis of a check result of the verification module,
for example a transmission apparatus for controlling a transmission of the message via a plurality of nodes, comprising:
for example a message data capture module, wherein
for example the message data capture module reads a priority data record with a priority from a message,
for example the message data capture module reads a destination of the message,
for example the priority is assigned transmission parameters for the message transmission;
for example a determination module, wherein for example the determination module generates a message control data record for controlling the transfer of the message on the basis of the destination and the priority,
for example the message control data record is assigned to the message,
for example a transfer module, wherein
for example the transfer module transmits the message to a node of a distributed database system depending on the message control data record,
for example the node is specified by the message control data record,
for example the communication interface transmits a message by means of a transmission apparatus.

Figure 5:
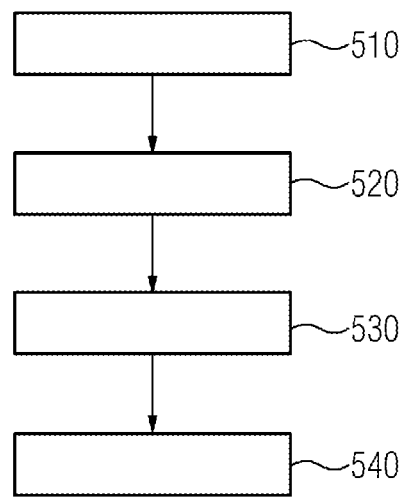
FIG. 5 depicts a further exemplary embodiment of the present invention.

FIG. 5 shows a further exemplary embodiment of the present invention, illustrated in the form of a flowchart for a method.

The method is performed in a computer-aided manner.

In detail, a method for computer-aided calculation of a cryptographic checksum in this exemplary embodiment.

The method comprises a first method step 510 for capturing individual features of an object by means of a capture device.

The method comprises an optional second method step 520 for calculating an object-specific characteristic on the basis of the individual features.

The method comprises a third method step 530 for providing a first cryptographic key on the basis of the individual features and/or the object-specific characteristic.

The method comprises a fourth method step 540 for cryptographically protecting a data structure by means of a cryptographic checksum, wherein the cryptographic checksum is calculated by means of the first cryptographic key.

A further embodiment of the present invention, not shown in a figure, illustrates relates to a method for computer-aided verification of a cryptographic checksum.

The method is performed in a computer-aided manner.

The method comprises a first method step for receiving a data structure, wherein the data structure is protected by means of a cryptographic checksum.

The method comprises a second method step for capturing individual features of an object by means of a capture device.

The method comprises a third optional method step for calculating an object-specific characteristic on the basis of the individual features.

The method comprises a fourth method step for providing a first cryptographic key on the basis of the individual features and/or the object-specific characteristic.

The method comprises a fifth method step for verifying the cryptographic checksum by means of the first cryptographic key.

Figure 6:
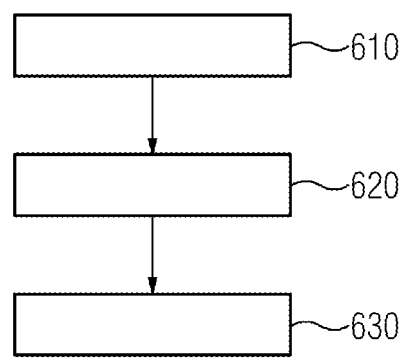
FIG. 6 depicts a further exemplary embodiment of the present invention.

FIG. 6 shows a further exemplary embodiment of the present invention as a flowchart for a method.

The method is performed in a computer-aided manner.

In detail, a method for computer-aided control of a data transfer is illustrated in this exemplary embodiment.

The method comprises a first method step 610 for transferring messages, wherein the messages are transferred to a distributed database system for example.

The method comprises a second method step 620 for verifying a data write configuration, wherein the data write configuration specifies the conditions under which the messages are written to the distributed database system, verifying whether the conditions for writing the messages to the distributed database system are met;

The method comprises a third method step 630 for transferring the messages to a distributed database system by means of a communication interface, wherein the transfer is controlled on the basis of a check result of verifying the data write configuration.

Figure 7:
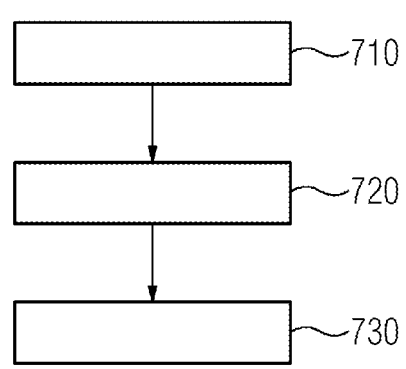
FIG. 7 depicts a further exemplary embodiment of the present invention.

FIG. 7 shows a further exemplary embodiment of the present invention as a flowchart for a method.

The method is performed in a computer-aided manner.

In detail, this exemplary embodiment illustrates a method for computer-aided control of the transmission of messages via a plurality of nodes.

The method comprises a first method step 710 for reading a message of a priority data record with a priority of a message, wherein a destination of the message is read, the priority is assigned transmission parameters for the message transmission.

The method comprises a second method step 720 for determining a message control data record for controlling the transfer of the message on the basis of the priority and the destination, wherein the message control data record is assigned to the message.

The method comprises a third method step 730 for transmitting the message to a node of a distributed database system depending on the message control data record, wherein the node is specified by the message control data record.

The modules mentioned in the exemplary embodiments can for example be realized as stand-alone nodes and can be communicatively connected to one another via a communication infrastructure (e.g., of the distributed system or the distributed database system). Accordingly, a plurality of modules of the same type can be provided, for example to ensure increased reliability of the corresponding modules.

Further exemplary embodiments not shown in the figures are briefly explained in the following section.

A further embodiment relates to a computer-aided method comprising the following method steps:
for example providing one of a key, wherein
for example the key is calculated on the basis of input data, or
for example, the key is retrieved or transferred or received via a data interface;
for example providing metadata for an entry in a database (e.g., a distributed database system), wherein
for example the metadata are calculated, for example by virtue of transferring or receiving a reference or a link to the entry and, for example, reading the corresponding metadata for the entry from the database, or
for example the metadata are retrieved or transferred or received via a data interface;
for example storing a data pair of the key and the metadata.

A further embodiment relates to a computer-aided method comprising the following method steps:
for example capturing individual features of an object by means of a capture device;
for example calculating an object-specific characteristic on the basis of the individual features;
for example providing a first cryptographic key on the basis of the individual features and/or the object-specific characteristic;
for example cryptographically protecting a data structure by means of a cryptographic checksum, wherein the cryptographic checksum is calculated by means of the first cryptographic key;

for example writing the data structure to a database (e.g., a distributed database system), wherein
for example, a key (e.g., also referred to as an allocation key) is formed for an entry in the database that, e.g., comprises the data structure (the data structure was stored in this entry),
for example metadata about the entry in the database are written to an allocation apparatus by means of the key.

A further embodiment relates to a computer-aided method comprising the following method steps:
for example capturing individual features of an object by means of a capture device;
for example providing a first cryptographic key on the basis of the individual features and/or an object-specific characteristic;
for example cryptographically protecting a data structure by means of a cryptographic checksum, wherein the cryptographic checksum is calculated by means of the first cryptographic key;
for example writing the data structure to a database (e.g., a distributed database system), wherein
for example, a key (e.g., also referred to as an allocation key) is formed for an entry in the database that, e.g., comprises the data structure (the data structure was stored in this entry),
for example metadata about the entry in the database are written to an allocation apparatus by means of the key.

A further embodiment relates to a computer-aided method comprising the following method steps:
for example capturing individual features of an object by means of a capture device;
for example, cryptographically protecting a data structure by means of a cryptographic checksum, wherein the cryptographic checksum is calculated by means of the individual features and/or the object-specific features;
for example writing the data structure to a database (e.g., a distributed database system), wherein
for example, a key (e.g., also referred to as an allocation key) is formed for an entry in the database that, e.g., comprises the data structure (the data structure was stored in this entry),
for example metadata about the entry in the database are written to an allocation apparatus by means of the key.

A further embodiment relates to a computer-aided method comprising the following method steps:
for example receiving a data structure, wherein the data structure is protected by means of a cryptographic checksum;
for example capturing individual features of an object by means of a capture device;
for example calculating an object-specific characteristic on the basis of the individual features;
for example providing a first cryptographic key on the basis of the individual features and/or the object-specific characteristic;
for example verifying the cryptographic checksum by means of the first cryptographic key, wherein
for example a key (e.g., also referred to as an allocation key) is formed for the data structure and/or for the object,
for example metadata for an entry in a database (e.g., a distributed database system) is loaded from an allocation apparatus by means of the key,
for example, another data structure and/or another cryptographic checksum is loaded from the database using the metadata for the entry,
for example the verification is implemented by virtue of the further cryptographic checksum being compared to the cryptographic checksum.

A further embodiment relates to a computer-aided method comprising the following method steps:
for example capturing individual features of an object by means of a capture device;
for example providing a first cryptographic key on the basis of the individual features and/or an object-specific characteristic;
for example verifying the cryptographic checksum by means of the first cryptographic key.

A further embodiment relates to a computer-aided method comprising the following method steps:
for example capturing individual features of an object by means of a capture device;
for example providing a first cryptographic key on the basis of the individual features and/or an object-specific characteristic;
for example verifying the cryptographic checksum by means of the first cryptographic key, wherein
for example a key (e.g., also referred to as an allocation key) is formed for the data structure and/or for the object,
for example metadata for an entry in a database (e.g., a distributed database system) is loaded from an allocation apparatus by means of the key,
for example, another data structure and/or another cryptographic checksum is loaded from the database using the metadata for the entry,
for example the verification is implemented by virtue of the further cryptographic checksum being compared to the cryptographic checksum.

A further embodiment relates to a computer-aided method comprising the following method steps:
for example capturing individual features (M) of an object (O) by means of a capture device (A);
for example verifying a cryptographic checksum of a data structure, wherein
for example a key (e.g., also referred to as an allocation key) is formed for the data structure and/or for the object,
for example metadata for an entry in a database (e.g., a distributed database system) is loaded from an allocation apparatus by means of the key,
for example, another data structure and/or another cryptographic checksum is loaded from the database using the metadata for the entry,
for example the verification is implemented by virtue of the further cryptographic checksum being compared to the cryptographic checksum.

A further embodiment relates to a computer-aided method comprising the following method steps:
for example verifying a cryptographic checksum of a data structure, wherein
for example a key (e.g., also referred to as an allocation key) is formed for the data structure and/or for the object,
for example metadata for an entry in a database (e.g., a distributed database system) is loaded from an allocation apparatus by means of the key,
for example, another data structure and/or another cryptographic checksum is loaded from the database using the metadata for the entry, for example the verification is implemented by virtue of the further cryptographic checksum being compared to the cryptographic checksum.

A further embodiment relates to a computer-aided method comprising the following method steps:

for example capturing individual features (M) of an object (O) by means of a capture device (A);

for example verifying a cryptographic checksum of a data structure, wherein for example a key (e.g., also referred to as an allocation key) for the data structure and/or for the object is formed on the basis of the individual features (M) and/or an object-specific characteristic, for example to load metadata for an entry in a database (e.g., a distributed database system) from an allocation apparatus by means of the key, for example, another data structure and/or another cryptographic checksum is loaded from the database using the metadata for the entry, for example the verification is implemented by virtue of the further cryptographic checksum being compared to the cryptographic checksum.

The aforementioned exemplary embodiments, embodiments and the variants thereof can, for example, additionally comprise communication interfaces (e.g., Ethernet, mobile radio such as 5G) or data interfaces in order to optionally receive, send, and write the necessary data (e.g., to the distributed database system).

The embodiment of the present invention relates to an ecosystem of devices that interact with one another autonomously by means of a blockchain. In particular, security-protected data processing of sensor data or measurement data for an object is realized by means of the present invention with a blockchain infrastructure. Areas of application are supply chain scenarios or industrial control applications of blockchains.

Although the embodiment of the present invention has been illustrated and described in more detail by the exemplary embodiments, the present invention is not restricted by the disclosed examples and other variations may be derived therefrom by a person skilled in the art without departing from the scope of protection of the present invention.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed:

1. A device for calculating a cryptographic checksum for a data structure, comprising:
   a capture module for capturing individual features of an object by a capture device;
   a calculation module for calculating an object-specific characteristic on a basis of the individual features;
   a cryptography module for providing a first cryptographic key on a basis of the individual features; and
   a protection module for cryptographically protecting a data structure by way of a cryptographic checksum, wherein the protection module calculates the cryptographic checksum by way of the first cryptographic key,
   wherein the individual features are compared with a predefined reference value, and when there is a match between the predefined reference value and the individual features the first cryptographic key is released by the cryptography module.

2. The device as claimed in claim 1, wherein:
   the characteristic is calculated taking into account specified tolerance values of the individual features,
   the first cryptographic key is calculated on a basis of the characteristic and the individual features, or
   a second cryptographic key, which decrypts the first cryptographic key, is calculated on the basis of the characteristic and the individual features.

3. The device as claimed in claim 1, wherein:
   the data structure comprises an object data record,
   the object data record specifies geometric points and interfaces at which the capture device can capture the individual features,
   the object data record comprises the individual features and the object-specific characteristic in encrypted form,
   the encrypted the individual features or the object-specific characteristic can be decrypted by means of the first cryptographic key or a third cryptographic key,
   the object data record comprises further object-related data, the further object-related data includes at least one of: measurement values of the object, measurement values about the object, manufacturing details of the object, and whereabouts of the object,
   the further object data are captured by sensors of the device for the object,
   the sensors include at least one of a GPS module, temperature sensors, optical sensors, and combinations thereof which detect corresponding properties of the object.

4. The device as claimed in claim 1, wherein:
   the first cryptographic key is additionally calculated taking into account by a secret character string, and
   the first cryptographic key is a private key of an asymmetric key pair or is a symmetric key.

5. The device as claimed in claim 1, wherein:
   the data structure is a transaction of a distributed database system and the cryptographic checksum is the transaction checksum,
   the distributed database system is a blockchain,
   the device is as a node or oracle of the distributed database system,
   the cryptographic checksum is a digital signature.

6. A verification device for verifying a cryptographic checksum of a data structure, comprising:
   a reception module for receiving a data structure, wherein the data structure is protected by a cryptographic checksum;
   a capture module for capturing individual features of an object by a capture device;
   a calculation module for calculating an object-specific characteristic on a basis of the individual features;
   a cryptography module for providing a first cryptographic key on a basis of the individual features and the object-specific characteristic; and
   a verification module for verifying the cryptographic checksum by the first cryptographic key,
   wherein the individual features are compared with a predefined reference value, and when there is a match between the predefined reference value and the individual features the first cryptographic key is released by the cryptography module.

7. A write control module, comprising:
a communication interface for transferring messages, wherein the messages are transferred to a distributed database system;
a verification module, wherein:
the verification module loads a data write configuration that specifies conditions under which the messages are written to the distributed database system,
the verification module verifies whether the conditions for writing the messages to the distributed database system are met;
a transfer control module, wherein:
the transfer control module controls a transfer of a message to the distributed database system by the communication interface on a basis of a check result of the verification module,
wherein the message contains an object with individual features such that the individual features are comparable with a predefined reference value, and when there is a match between the predefined reference value and the individual features a first cryptographic key is releasable by a cryptography module.

8. The write control module as claimed in claim 7, wherein:
the data write configuration stipulates that one or more specified nodes have already written messages to the distributed database system,
the conditions of the data write configuration stipulate that messages from the nodes are already available in the distributed database system.

9. The write control module as claimed in claim 7, wherein:
the checksums of messages from one or more nodes are verified when verifying the conditions of the data write configuration,
the messages for verification are stored in the distributed database system,
the conditions which the messages are to meet for verification are determined by the data write configuration.

10. The write control module as claimed in claim 7, wherein:
the write control module selects one or more checksum-protected messages of the distributed database system, wherein corresponding data about the corresponding messages are stored by the sending apparatus,
the write control module verifies the selected messages or some of the selected messages on a basis of the stored messages when verifying the conditions of the data write configuration.

11. The write control module as claimed in claim 7, wherein the data write configuration conditions comprise one, more or a combination of the following parameters:
a time window that must be observed for messages to be verified or selected,
the nodes are specified by the corresponding node information,
the messages of the corresponding nodes must comprise a specified content,
the checksums of the messages to be verified must meet specified cryptographic conditions.

12. A transmission apparatus for controlling a transmission of a message, comprising:
a message data capture module, wherein
the message data capture module reads a priority data record with a priority from a message,
the message data capture module reads a destination of the message,
the priority is assigned transmission parameters for the message transmission;
a determination module, wherein
the determination module generates a message control data record for controlling the transfer of the message on a basis of the destination and the priority,
the message control data record is assigned to the message,
a transfer module, wherein
the transfer module transmits the message to a node of a distributed database system depending on the message control data record,
the node is specified by the message control data record,
wherein the message contains an object with individual features such that the individual features are comparable with a predefined reference value, and when there is a match between the predefined reference value and the individual features a first cryptographic key is releasable by a cryptography module.

13. The transmission apparatus as claimed in claim 12, wherein
the message control data record comprises a route over a plurality of nodes of the distributed database system,
to ascertain the route, the transmission time of messages between the nodes is transferred by the nodes to the transmission apparatus and, the corresponding transmission times are taken into account when ascertaining the message control data record,
the route for example is determined on a basis of the result of the check.

14. The transmission apparatus as claimed in claim 12, wherein
the message control data record comprises configuration data,
the configuration data are determined on a basis of the result of a check,
there is verification as to whether the message is transferred in such a way that it observes the specifications of the priority or transmission parameters,
the transfer module is configured in such a way that a separate communication channel to the destination is set up to transfer the message.

15. The transmission apparatus as claimed in claim 12, wherein
a confirmation transaction is stored in the distributed database system after the destination has received the message.

16. The transmission apparatus as claimed in claim 12, wherein
the message control data record additionally comprises a preconfigured data record which at least partially specifies the transfer path of the message to the destination.

17. The transmission apparatus as claimed in claim 12, wherein
the priority data record with the priority is specified by the sensor device and the message comprises a data structure, and
checksums are transaction checksums and the distributed database system is a blockchain and the message is a validated or unvalidated transaction of a distributed database system.

18. A system, comprising:
a generation module for generating messages for an object, wherein the message for example comprises a priority data record with a priority and a data structure;
a device for calculating a cryptographic checksum for the data structure, comprising:

a capture module for capturing individual features of the object by means of a capture device;

a calculation module for calculating an object-specific characteristic on a basis of the individual features;

a cryptography module for providing a cryptographic key on a basis of the individual features and the object-specific characteristic;

a protection module for cryptographically protecting the data structure by a cryptographic checksum, wherein the protection module calculates the cryptographic checksum by the cryptographic key;

a write control module, comprising:

a communication interface for transferring messages, wherein the messages are transferred to a distributed database system;

a verification module, wherein the verification module loads a data write configuration that specifies conditions under which the messages are written to the distributed database system, the verification module verifies whether the conditions for writing the messages to the distributed database system are met;

a transfer control module, wherein the transfer control module controls a transfer of a message to the distributed database system by the communication interface on a basis of a check result of the verification module, a transmission apparatus for controlling a transmission of the message via a plurality of nodes, comprising:

a message data capture module, wherein the message data capture module reads a priority data record with a priority from a message, the message data capture module reads a destination of the message, the priority is assigned transmission parameters for the message transmission;

a determination module, wherein the determination module generates a message control data record for controlling the transfer of the message on the basis of the destination and the priority, the message control data record is assigned to the message, a transfer module, wherein the transfer module transmits the message to a node of a distributed database system depending on the message control data record, the node is specified by the message control data record, the communication interface transmits a message by the transmission apparatus.

19. A method of computer-aided calculation of a cryptographic checksum, the method comprising:

capturing individual features of an object by a capture device;

calculating an object-specific characteristic on a basis of the individual features;

providing a first cryptographic key on a basis of the individual features and the object-specific characteristic; and cryptographically protecting a data structure by means of a cryptographic checksum, wherein the cryptographic checksum is calculated by the first cryptographic key;

comparing the individual features with a predefined reference value; and releasing the first cryptographic key when there is a match between the predefined reference value and the individual features.

20. A method of computer-aided verification of a cryptographic checksum, the method comprising:

receiving a data structure, wherein the data structure is protected by a cryptographic checksum;

capturing individual features of an object by means of a capture device;

calculating an object-specific characteristic on a basis of the individual features;

providing a first cryptographic key on a basis of the individual features and the object-specific characteristic; and verifying the cryptographic checksum by the first cryptographic key;

comparing the individual features with a predefined reference value; and releasing the first cryptographic key when there is a match between the predefined reference value and the individual features.

21. A method of computer-aided control of a data transfer, the method comprising:

transferring messages, wherein the messages are transferred to a distributed database system;

verifying a data write configuration, wherein:

the data write configuration specifies conditions under which the messages are written to the distributed database system, verifying whether the conditions for writing the messages to the distributed database system are met;

transferring the messages to a distributed database system by a communication interface, wherein:

the transfer is controlled on a basis of a check result of verifying the data write configuration, wherein the messages each contain an object with individual features such that the individual features are comparable with a predefined reference value, and when there is a match between the predefined reference value and the individual features a first cryptographic key is releasable by a cryptography module.

22. A method of computer-aided control of a transmission of messages via a plurality of nodes, the method comprising:

reading a message of a priority data record with a priority of a message, wherein:

a destination of the message is read, the priority is assigned transmission parameters for the message transmission;

determining a message control data record for controlling the transfer of the message on a basis of the priority and the destination, wherein:

the message control data record is assigned to the message, transmitting the message to a node of a distributed database system depending on the message control data record, wherein:

the node is specified by the message control data record, and wherein the message contains an object with individual features such that the individual features are comparable with a predefined reference value, and when there is a match between the predefined reference value and the individual features a first cryptographic key is releasable by a cryptography module.

23. A computer program product, comprising a computer readable hardware storage device having computer readable program code stored therein, said program code executable by a processor of a computer system to implement a method of computer-aided calculation of a cryptographic checksum, the method comprising:

capturing individual features of an object by a capture device;

calculating an object-specific characteristic on a basis of the individual features;

providing a first cryptographic key on a basis of the individual features and the object-specific characteristic; and cryptographically protecting a data structure by means of a cryptographic checksum, wherein the cryptographic checksum is calculated by the first cryptographic key;

comparing the individual features with a predefined reference value; and releasing the first cryptographic key when there is a match between the predefined reference value and the individual features.

24. A provision device for a computer program product, wherein the provision device stores or provides the computer program product, wherein the computer program product comprises a computer readable hardware storage device having computer readable program code stored therein, said program code executable by a processor of a computer system to implement a method of computer-aided calculation of a cryptographic checksum, the method comprising:

capturing individual features of an object by a capture device;

calculating an object-specific characteristic on a basis of the individual features;

providing a first cryptographic key on a basis of the individual features and the object-specific characteristic; and cryptographically protecting a data structure by means of a cryptographic checksum, wherein the cryptographic checksum is calculated by the first cryptographic key;

comparing the individual features with a predefined reference value; and releasing the first cryptographic key when there is a match between the predefined reference value and the individual features.

25. A computer program product, comprising a computer readable hardware storage device having computer readable program code stored therein, said program code executable by a processor of a computer system to implement a method of computer-aided calculation of a cryptographic checksum, the method comprising:

receiving a data structure, wherein the data structure is protected by a cryptographic checksum;

capturing individual features of an object by means of a capture device;

calculating an object-specific characteristic on a basis of the individual features;

providing a first cryptographic key on a basis of the individual features and the object-specific characteristic; and verifying the cryptographic checksum by the first cryptographic key;

comparing the individual features with a predefined reference value; and releasing the first cryptographic key when there is a match between the predefined reference value and the individual features.

26. A computer program product, comprising a computer readable hardware storage device having computer readable program code stored therein, said program code executable by a processor of a computer system to implement a method of computer-aided calculation of a cryptographic checksum, the method comprising:

transferring messages, wherein the messages are transferred to a distributed database system;

verifying a data write configuration, wherein:

the data write configuration specifies conditions under which the messages are written to the distributed database system, verifying whether the conditions for writing the messages to the distributed database system are met;

transferring the messages to a distributed database system by a communication interface, wherein:

the transfer is controlled on a basis of a check result of verifying the data write configuration, wherein the messages each contain an object with individual features such that the individual features are comparable with a predefined reference value, and when there is a match between the predefined reference value and the individual features a first cryptographic key is releasable by a cryptography module.

27. A computer program product, comprising a computer readable hardware storage device having computer readable program code stored therein, said program code executable by a processor of a computer system to implement a method of computer-aided calculation of a cryptographic checksum, the method comprising:

reading a message of a priority data record with a priority of a message, wherein:

a destination of the message is read, the priority is assigned transmission parameters for the message transmission;

determining a message control data record for controlling the transfer of the message on a basis of the priority and the destination, wherein:

the message control data record is assigned to the message, transmitting the message to a node of a distributed database system depending on the message control data record, wherein:

the node is specified by the message control data record, and wherein the message contains an object with individual features such that the individual features are comparable with a predefined reference value, and when there is a match between the predefined reference value and the individual features a first cryptographic key is releasable by a cryptography module.

* * * * *